(12) United States Patent
Chatterjee et al.

(10) Patent No.: US 9,119,097 B2
(45) Date of Patent: Aug. 25, 2015

(54) ADAPTIVE UL-DL TDD CONFIGURATIONS IN A HETEROGENEOUS NETWORK

(71) Applicants: Debdeep Chatterjee, Santa Clara, CA (US); Jong-Kae Fwu, Sunnyvale, CA (US); Alexey Khoryaev, Dzerzhinsk (RU); Hong He, Beijing (CN); Mikhail A. Shilov, Nizhny Novgorod (RU); Andrey Chervyakov, Nizhny Novgorod (RU); Sergey Panteleev, Nizhny Novgorod (RU)

(72) Inventors: Debdeep Chatterjee, Santa Clara, CA (US); Jong-Kae Fwu, Sunnyvale, CA (US); Alexey Khoryaev, Dzerzhinsk (RU); Hong He, Beijing (CN); Mikhail A. Shilov, Nizhny Novgorod (RU); Andrey Chervyakov, Nizhny Novgorod (RU); Sergey Panteleev, Nizhny Novgorod (RU)

(73) Assignee: INTEL CORPORATION, Santa Clara, CA (US)

( * ) Notice: Subject to any disclaimer, the term of this patent is extended or adjusted under 35 U.S.C. 154(b) by 106 days.

(21) Appl. No.: 13/734,355

(22) Filed: Jan. 4, 2013

(65) Prior Publication Data
US 2013/0272170 A1 Oct. 17, 2013

Related U.S. Application Data

(60) Provisional application No. 61/624,185, filed on Apr. 13, 2012.

(51) Int. Cl.
*G01R 31/08* (2006.01)
*H04W 28/08* (2009.01)
(Continued)

(52) U.S. Cl.
CPC ............. *H04W 28/08* (2013.01); *H04L 5/0001* (2013.01); *H04W 24/02* (2013.01); *H04W*
(Continued)

(58) Field of Classification Search
CPC ... H04W 28/08; H04W 28/02; H04W 72/042; H04W 74/0808; H04W 36/08; H04W 76/023; H04W 24/02; H04W 36/0016; H04L 5/0001; Y02B 60/50
See application file for complete search history.

(56) References Cited

U.S. PATENT DOCUMENTS 8,644,277 B2 * 2/2014 Zhang et al. .................. 370/338
2009/0249153 A1 10/2009 Zhang
(Continued)

FOREIGN PATENT DOCUMENTS

| EP | 2375809 A1 | 10/2011 |
|---|---|---|
| KR | 101077778 B1 | 10/2011 |
| WO | 2013/155373 A1 | 10/2013 |

OTHER PUBLICATIONS

Fwu et al., "Interference Management for Dynamic Uplink and Downlink Configuration", U.S. Appl. No. 13/612,318, filed Sep. 12, 2012, 49 pages.
(Continued)

*Primary Examiner* — Robert Wilson
(74) *Attorney, Agent, or Firm* — Thorpe North & Western LLP

(57) ABSTRACT

Technology for adapting uplink-downlink (UL-DL) time-division duplexing (TDD) subframe configurations in a heterogeneous network (HetNet) is disclosed. One method can include a reference enhanced Node B (eNB) determining a preferred adaptive UL-DL configuration. The eNB can receive node configuration information for at least one neighboring node. The eNB can reconfigure an adaptive UL-DL configuration for at least one of the reference eNB and the at least one neighboring node based on the node configuration information and sounding reference signal (SRS) subframe scheduling of the reference eNB and the at least one neighboring eNB.

27 Claims, 16 Drawing Sheets

(51) Int. Cl.
*H04W 28/02* (2009.01)
*H04L 5/00* (2006.01)
*H04W 72/04* (2009.01)
*H04W 74/08* (2009.01)
*H04W 36/08* (2009.01)
*H04W 24/02* (2009.01)
*H04W 76/02* (2009.01)
*H04W 24/10* (2009.01)
*H04W 36/00* (2009.01)

(52) U.S. Cl.
CPC ........ 28/02 (2013.01); *H04W 36/08* (2013.01); *H04W 72/04* (2013.01); *H04W 72/042* (2013.01); *H04W 74/0808* (2013.01); *H04W 76/023* (2013.01); *H04W 24/10* (2013.01); *H04W 36/0016* (2013.01); *H04W 76/028* (2013.01); *Y02B 60/50* (2013.01)

(56) References Cited

U.S. PATENT DOCUMENTS

| | | | | |
|---|---|---|---|---|
| 2011/0013531 | A1* | 1/2011 | Liu | 370/252 |
| 2011/0216713 | A1* | 9/2011 | Kim et al. | 370/329 |
| 2011/0268087 | A1* | 11/2011 | Kwon et al. | 370/331 |
| 2012/0039263 | A1 | 2/2012 | Moberg et al. | |
| 2012/0147810 | A1* | 6/2012 | Wang et al. | 370/315 |
| 2012/0230232 | A1* | 9/2012 | Ji et al. | 370/280 |
| 2012/0230273 | A1* | 9/2012 | He et al. | 370/329 |
| 2012/0236805 | A1* | 9/2012 | Kuo et al. | 370/329 |
| 2013/0194982 | A1* | 8/2013 | Fwu et al. | 370/280 |
| 2013/0201841 | A1* | 8/2013 | Zhang et al. | 370/252 |
| 2013/0272169 | A1* | 10/2013 | Wang et al. | 370/280 |
| 2013/0272170 | A1* | 10/2013 | Chatterjee et al. | 370/280 |
| 2013/0286904 | A1* | 10/2013 | Xu et al. | 370/280 |
| 2013/0301489 | A1* | 11/2013 | Sirotkin et al. | 370/280 |
| 2013/0301490 | A1* | 11/2013 | He et al. | 370/280 |
| 2013/0322235 | A1* | 12/2013 | Khoryaev et al. | 370/229 |
| 2014/0098720 | A1* | 4/2014 | ZENG et al. | 370/280 |
| 2014/0098721 | A1* | 4/2014 | Chen et al. | 370/280 |
| 2014/0160967 | A1* | 6/2014 | Gao et al. | 370/252 |

OTHER PUBLICATIONS

He et al., "Automatic Uplink-Downlink Ratio Reconfiguration Setting in Wireless Communication System", U.S. Appl. No. 13/526,767, filed Jun. 19, 2012, 33 pages.

He et al., "Dynamic Uplink and Downlink Configuration Using Flexible Subframes", U.S. Appl. No. 13/608,369, filed Sep. 10, 2012, 43 pages.

Khoryaev et al., "Inter-Node Interference Cancellation", PCT patent application No. PCT/US2012/037757 filed on May 14, 2012, 38 pages.

Khoryaev et al., "Support for Asynchronous Adaptation to Uplink and Downlink Traffic Demands for Wireless Communication",U.S. Appl. No. 13/592,598, filed Aug. 23, 2012, 61 pages.

He et al., "Dynamic Direction Changing in Time Division Duplex Radios", PCT patent application No. PCT/CN2012/085913 filed on Dec. 5, 2012, 17 pages.

3rd Generation Partnership Project, Technical Specification Group Radio Access Network "Evolved Universal Terrestrial Radio Access (E-UTRA)", Physical Channels and Modulation (Release 11), 3GPP TS 36.211, vol. 11.2.0, Feb. 2013, 109 pages.

3rd Generation Partnership Project, Technical Specification Group Radio Access Network; Evolved Universal Terrestrial Radio Access (E-UTRA), Physical layer procedures (Release 11), 3GPP TS 36.213, vol. 11.2.0, Feb. 2013, 173 pages.

Intel Corp., "DL-UL Interference Analysis for Single Operator Macro-FEMTO Deployment Scenario in Adjacent Channel" 3GPP TSG-RAN WG4 #62, Dresden, Germany, Feb. 6-12, 2012, 8 pages.

Intel Corporation, "DL-UL Interference Analysis for Single Operator Macro-Outdoor PICO Deployment Scenario in Adjacent Channel", 3GPP TSG-RAN WG4 #62, Dresden, Germany, Feb. 6-12, 2012, 6 pages.

International Search Report and Written Opinion received for PCT Patent Application No. PCT/US2013/036305, mailed on Jul. 18, 2013, 12 pages.

LG Electronics, "Issues in Further Enhancements to LTE TDD" R1-121-461, 3GPP TSG RAN WG1 Meeting #68bis, Jeju, Korea, Mar. 26-30, 2012 See pp. 1-4.

* cited by examiner

ADAPTIVE UL-DL TDD CONFIGURATIONS IN A HETEROGENEOUS NETWORK

RELATED APPLICATIONS

This application claims the benefit of and hereby incorporates by reference U.S. Provisional Patent Application Ser. No. 61/624,185, filed Apr. 13, 2012.

BACKGROUND

Wireless mobile communication technology uses various standards and protocols to transmit data between a node (e.g., a transmission station or a transceiver node) and a wireless device (e.g., a mobile device). Some wireless devices communicate using orthogonal frequency-division multiple access (OFDMA) in a downlink (DL) transmission and single carrier frequency division multiple access (SC-FDMA) in an uplink (UL) transmission. Standards and protocols that use orthogonal frequency-division multiplexing (OFDM) for signal transmission include the third generation partnership project (3GPP) long term evolution (LTE), the Institute of Electrical and Electronics Engineers (IEEE) 802.16 standard (e.g., 802.16e, 802.16m), which is commonly known to industry groups as WiMAX (Worldwide interoperability for Microwave Access), and the IEEE 802.11 standard, which is commonly known to industry groups as WiFi.

In 3GPP radio access network (RAN) LTE systems, the node can be a combination of Evolved Universal Terrestrial Radio Access Network (E-UTRAN) Node Bs (also commonly denoted as evolved Node Bs, enhanced Node Bs, eNodeBs, or eNBs) and Radio Network Controllers (RNCs), which communicate with the wireless device, known as a user equipment (UE). The downlink (DL) transmission can be a communication from the node (e.g., eNodeB) to the wireless device (e.g., UE), and the uplink (UL) transmission can be a communication from the wireless device to the node.

In homogeneous networks, the node, also called a macro node, can provide basic wireless coverage to wireless devices in a cell. The cell can be the area in which the wireless devices are operable to communicate with the macro node. Heterogeneous networks (HetNets) can be used to handle the increased traffic loads on the macro nodes due to increased usage and functionality of wireless devices. HetNets can include a layer of planned high power macro nodes (or macro-eNBs) overlaid with layers of lower power nodes (small-eNBs, micro-eNBs, pico-eNBs, femto-eNBs, or home eNBs [HeNBs]) that can be deployed in a less well planned or even entirely uncoordinated manner within the coverage area (cell) of a macro node. The lower power nodes (LPNs) can generally be referred to as "low power nodes", small nodes, or small cells.

The macro node can be used for basic coverage. The low power nodes can be used to fill coverage holes, to improve capacity in hot-zones or at the boundaries between the macro nodes' coverage areas, and improve indoor coverage where building structures impede signal transmission. Inter-cell interference coordination (ICIC) or enhanced ICIC (eICIC) may be used for resource coordination to reduce interference between the nodes, such as macro nodes and low power nodes in a HetNet.

Homogeneous networks or HetNets can use time-division duplexing (TDD) or frequency-division duplexing (FDD) for DL or UL transmissions. Time-division duplexing (TDD) is an application of time-division multiplexing (TDM) to separate downlink and uplink signals. In TDD, downlink signals and uplink signals may be carried on a same carrier frequency where the downlink signals use a different time interval from the uplink signals, so the downlink signals and the uplink signals do not generate interference for each other. TDM is a type of digital multiplexing in which two or more bit streams or signals, such as a downlink or uplink, are transferred apparently simultaneously as sub-channels in one communication channel, but are physically transmitted on different resources. In frequency-division duplexing (FDD), an uplink transmission and a downlink transmission can operate using different frequency carriers. In FDD, interference can be avoided because the downlink signals use a different frequency carrier from the uplink signals.

BRIEF DESCRIPTION OF THE DRAWINGS

Features and advantages of the disclosure will be apparent from the detailed description which follows, taken in conjunction with the accompanying drawings, which together illustrate, by way of example, features of the disclosure; and, wherein.

Figure 1:
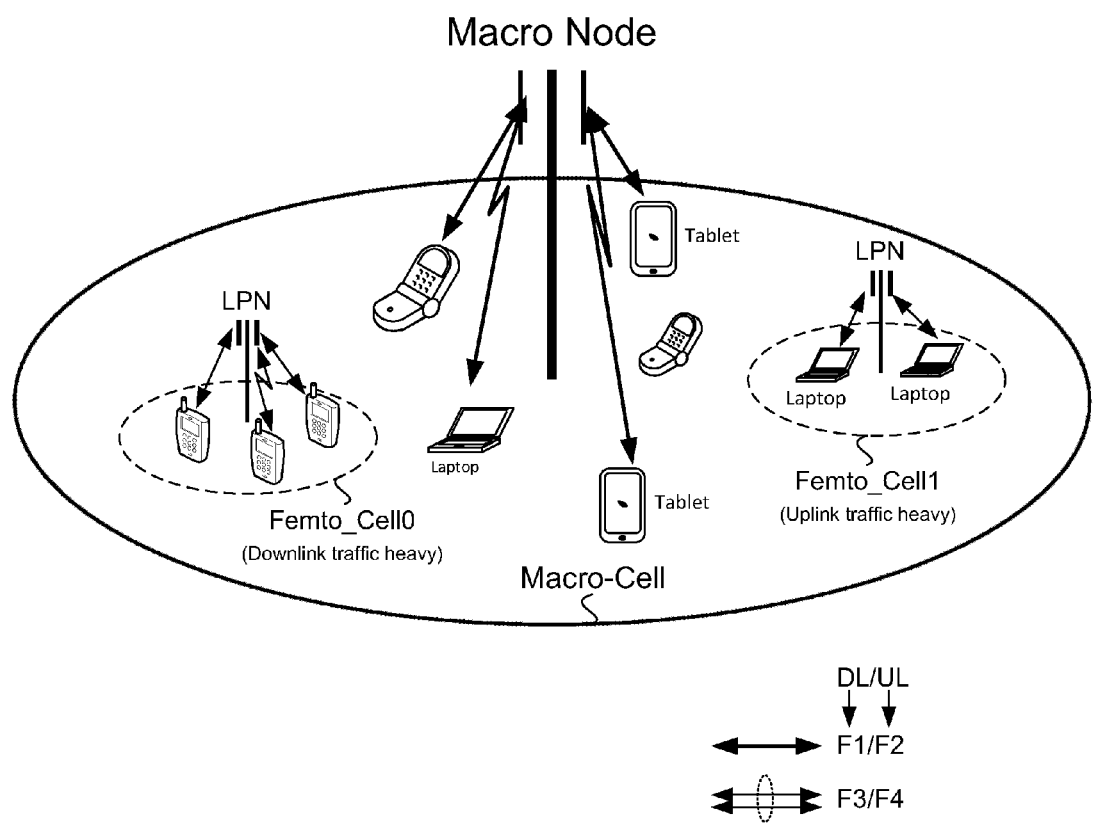
FIG. 1 illustrates a diagram of dynamic uplink-downlink (UL-DL) reconfiguration usage in a time-division duplexing (TDD) system in accordance with an example.

Reference will now be made to the exemplary embodiments illustrated, and specific language will be used herein to describe the same. It will nevertheless be understood that no limitation of the scope of the invention is thereby intended.

DETAILED DESCRIPTION

Before the present invention is disclosed and described, it is to be understood that this invention is not limited to the particular structures, process steps, or materials disclosed herein, but is extended to equivalents thereof as would be recognized by those ordinarily skilled in the relevant arts. It should also be understood that terminology employed herein is used for the purpose of describing particular examples only and is not intended to be limiting. The same reference numerals in different drawings represent the same element. Numbers provided in flow charts and processes are provided for clarity in illustrating steps and operations and do not necessarily indicate a particular order or sequence.

Example Embodiments

An initial overview of technology embodiments is provided below and then specific technology embodiments are described in further detail later. This initial summary is intended to aid readers in understanding the technology more quickly but is not intended to identify key features or essential features of the technology nor is it intended to limit the scope of the claimed subject matter.

Heterogeneous network (HetNet) deployments can offer efficient means to increase cellular coverage and capacity compared to traditional homogeneous networks and may involve the co-existence of different radio access technologies (RAT), transmission-reception techniques, and base station (BS) or node transmission powers amongst other possible architectural combinations. The RAT can include the standard used, such as LTE or IEEE 802.16, or the version of the standard, such as LTE version 11, 3GPP LTE V11.0.0, IEEE 802.16n, or IEEE 802.16p. In an example, the radio access technology (RAT) standard can include LTE release 8, 9, 10, 11, or subsequent release. The transmission-reception technique can include various transmission techniques, such as a downlink (DL) coordinated multi-point (CoMP) transmission, enhanced inter-cell interference coordination (eICIC), and combinations thereof. A node transmission power can refer to the power generated by a node type, such as a macro node (e.g., macro evolved Node B (eNB)) in a macro cell and multiple low power nodes (LPNs or small eNBs) in the respective small cells, as illustrated in FIG. 1. FIG. 1 illustrates a layered HetNet deployment with different node transmission powers using time-division duplexing (TDD). As used herein, a cell can refer to the node or the coverage area of the node. A low power node (LPN) can refer to a small node, which can include a small eNB, a micro eNB, a pico node, a pico eNB, a femto-eNB, a home eNB (HeNB), a remote radio head (RRH), a remote radio equipment (RRE), or a remote radio unit (RRU). As used herein, the term "small node" may be used interchangeably with the term "pico node" (or pico eNB), and the term "small cell" may be used interchangeably with the term "pico cell" in the examples to assist in distinguishing between the macro node and the LPN or the small node, and the macro cell and the small cell. The macro node can be connected to each LPN via backhaul link using X2 interface or optical fiber connections.

The macro nodes can transmit at high power level, for example, approximately 5 watts (W) to 40 W, to cover the macro cell. The HetNet can be overlaid with low power nodes (LPNs), which may transmit at substantially lower power levels, such as approximately 100 milliwatts (mW) to 2 W. In an example, an available transmission power of the macro node may be at least ten times an available transmission power of the low power node. A LPN can be used in hot spots or hot-zones, referring to areas with a high wireless traffic load or high volume of actively transmitting wireless devices (e.g., user equipments (UEs)). A LPN can be used in a microcell, a picocell, a femtocell, and/or home network. Femto_Cell0 illustrates downlink traffic heavy usage by the wireless devices (e.g., UEs) and Femto_Cell1 illustrates uplink traffic heavy usage by the wireless devices. In a FDD example, the macro cell can use frequency bands F1 for DL and F2 for UL, and femtocells can use frequency bands F3 for DL and F4 for UL. In a TDD example, frequency bands F1/F2 can be used for DL and UL by the macro cell and frequency bands F3/F4 can be used for DL and UL by the femtocells.

The methods, processes, and system described herein can be applicable to various HetNet configurations, including layered HetNets with different node transmission powers. In systems, employing frequency division duplex (FDD), techniques, like enhanced inter-cell interference coordination (eICIC) and coordinated multi-point (CoMP), may be utilized to enable efficient operation of HetNets. Compared to FDD, time division duplex (TDD) can offer flexible deployment opportunities without using a pair of spectrum resources, and can enable further and adaptation of radio resource allocation in the time domain between uplink (UL) and downlink (DL) resources to suit different traffic conditions or any other performance metrics (e.g., energy saving).

Allowing adaptive UL-DL configurations depending on traffic conditions in different cells can significantly improve the system performance in some examples. FIG. 1 illustrates an example where different UL-DL configurations can considered in different cells. Networks (e.g., HetNets or homogeneous networks) can involve a same carrier or different carriers deployed by a single operator or different operators in the same band and employing either a same or different uplink-downlink (UL-DL) configurations. Where possible, interference may include adjacent channel interference (when different carrier frequencies are used) as well as co-channel interference (when a same carrier frequency is used) such as remote node-to-node interference (or BS-to-BS interference or eNB-to-eNB interference). For instance, the methods, processes, and system described herein can be straightforwardly extended to a scenario with two homogeneous deployments belonging to different operators on adjacent channels.

Legacy LTE TDD can support asymmetric UL-DL allocations by providing seven different semi-statically configured uplink-downlink configurations. Table 1 illustrates seven UL-DL configurations used in LTE, where "D" represents a downlink subframe, "S" represents a special subframe, and "U" represents an uplink subframe. In an example, the special subframe can operate or be treated as a downlink subframe.

TABLE 1

| Uplink-downlink configuration | Subframe number | | | | | | | | | |
|---|---|---|---|---|---|---|---|---|---|---|
| | 0 | 1 | 2 | 3 | 4 | 5 | 6 | 7 | 8 | 9 |
| 0 | D | S | U | U | U | D | S | U | U | U |
| 1 | D | S | U | U | D | D | S | U | U | D |
| 2 | D | S | U | D | D | D | S | U | D | D |
| 3 | D | S | U | U | U | D | D | D | D | D |
| 4 | D | S | U | U | D | D | D | D | D | D |
| 5 | D | S | U | D | D | D | D | D | D | D |
| 6 | D | S | U | U | U | D | S | U | U | D |

As illustrated by Table 1, UL-DL configuration 0 can include 6 uplink subframes in subframes 2, 3, 4, 7, 8, and 9, and 4 downlink and special subframes in subframes 0, 1, 5, and 6; and UL-DL configuration 5 can include one uplink subframe in subframe 2, and 9 downlink and special subframes in subframes 0, 1, and 3-9.

As an underlying requirement in some examples, all cells of the network change UL-DL (TDD) configurations synchronously in order to avoid the interference. However, such a requirement can constrain the traffic management capabilities in different cells of the network. The legacy LTE TDD set of configurations can provide DL subframe allocations in the range between 40% and 90%, as shown in Table 1. The UL and DL subframes allocation within a radio frame can be reconfigured through system information broadcast signaling (e.g., system information block [SIB]). Hence, the UL-DL allocation once configured can be expected to vary semi-statically.

Predetermined or semi-statically configured UL-DL configurations may not match the instantaneous traffic situation which can result in inefficient resource utilization, especially in cells with a small number of users that download or upload large amounts of data. Adaptive UL-DL configurations can be used to handle cell-dependent traffic asymmetry and match instantaneous traffic situations but can generate different types of interferences if not taken into consideration. For such time division LTE (TD-LTE) deployments with different UL-DL configurations in different cells, the new types of interferences due to asymmetric UL-DL configurations can include node-to-node (or BS-to-BS) and UE-to-UE interference, which can be mitigated using various mechanisms described herein. The impact of the inter-cell DL→UL (node-to-node) interference can significantly reduce the benefits obtained from the adaptability of UL-DL configurations in different cells. The methods, processes, and system described herein can provide mechanisms to support dynamic allocation of UL-DL subframes in a backward compatible manner with improved handling of the new interference types.

For example, a framework can be used for efficient operation of TDD-LTE systems with efficient support for adaptive UL-DL subframe configurations based on traffic conditions in different cells with considerations for backward compatibility and handling of new interference types. The framework can be extended to apply to adaptation of UL-DL TDD configuration based not only on traffic conditions but can include other performance metrics (e.g., energy saving) as well.

First, a physical resource structure to support adaptive UL-DL configurations in TD-LTE networks is presented along with various considerations to ensure backward compatibility and avoid any detrimental effect on measurement capabilities for legacy and advanced UEs. Then, mechanisms to handle the new types of interference are presented with emphasis on a more significant case of node-to-node interference. Finally, some signaling solutions to support adaptive UL-DL configurations are presented.

The legacy TDD-LTE frame structure can be modified to support adaptive UL-DL configurations and provide backward compatibility to a legacy TDD-LTE frame structure. In legacy TDD-LTE systems, seven different UL-DL configurations can be defined (Configurations 0-6, as shown in Table 1) for LTE type-2 (TDD) frames. Some of the legacy subframes may not change their transmission direction (DL or UL) among different configurations (e.g., fixed subframes or subframes 0, 1, 2, and 5, where 0 and 5 are DL subframes, 1 is a special subframe, and 2 is an UL subframe), while others can be used for transmission direction in either DL or UL transmission directions depending on the selected UL-DL configuration.

Figure 2:
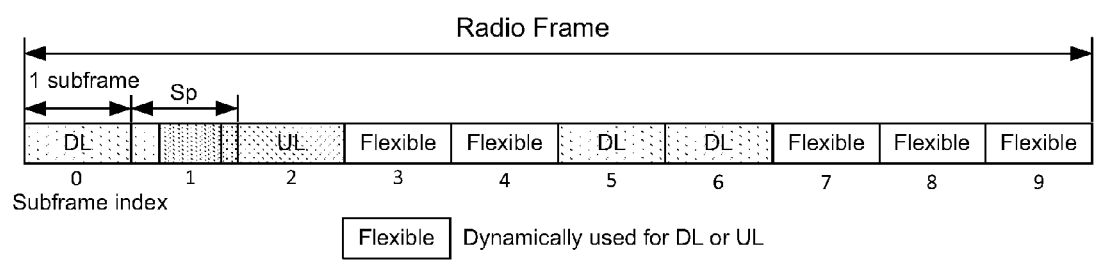
FIG. 2 illustrates a diagram of flexible subframe (FlexSF) of an uplink-downlink (UL-DL) time-division duplexing (TDD) frame structure in accordance with an example.

For instance, based on an assumption of reusing the existing seven UL-DL configurations and not introducing additional configurations, the subframes whose transmit direction (UL or DL) can be reconfigured can be defined as Flexible Subframes (FlexSFs), as illustrated in FIG. 2. FIG. 2 illustrates a radio frame structure that supports a legacy UL/DL configuration allocation for legacy UEs (in accordance with the supported UL/DL configurations shown in Table 1) and also facilitates a dynamic UL/DL re-configuration indication mechanism for advanced UEs according to some embodiments. The radio frame structure can include ten subframes denoted by subframe index 0 through 9 from left to right. Subframes 0, 5, and 6 can be designated as downlink subframes, Subframe 1 can be designated as a special subframe (i.e., Sp); Subframe 2 can be designated as an uplink subframe; and Subframes 3, 4, 7, 8, and 9 can be designated as flexible subframes (FlexSFs).

The flexible subframes within the radio frame can be designated for configuring flexible transmission directions, where each of the flexible subframes can be dynamically designated a downlink, uplink, special, or special uplink subframe for advanced UEs, which can be configured with a flexible subframe. The special uplink subframe can include a downlink transmission period to transmit downlink control channels, a central guard period (GP) to switch between a downlink and uplink transmission, and an uplink data transmission period. In a TDD-LTE deployment, the radio frame structure can be 10 millisecond (ms) in a time duration and each subframe within the radio frame structure can be 1 ms in duration. In another configuration (not shown), any of the 10 subframes can be designated as flexible subframes (not just Subframes 3, 4, 7, 8, and 9), which can be dynamically (e.g., 1 ms) or semi-statically (e.g., every 600 ms) configured as a DL, UL, or special subframe.

The FlexSFs can be used to adapt UL-DL subframe configuration according to traffic/loading condition as well as for interference management purposes. Thus, each LTE type-2 frame can include FlexSFs and non-flexible subframes (fixed subframes). The fixed subframes can have fixed or semi-static transmission direction (in either UL or DL) and may not change their transmission directions to preserve backward compatibility with legacy UEs.

A node (e.g., macro node, pico node, or femto node) can utilize the FlexSFs (FIG. 2) and determine to change the transmit direction of the FlexSFs dynamically based on local traffic conditions and/or interference conditions. The FlexSFs may be initialized to a default transmission direction and then the FlexSFs may be adjusted based on the default UL-DL configurations (one of the seven different legacy UL-DL configurations), which may be different from the example shown in FIG. 2.

In an example, the FlexSFs can be transparent to legacy UEs (with a transmission direction determined from one of the seven different legacy UL-DL configurations) and the UL-DL configuration can be changed semi-statically for legacy UEs (i.e., unable to utilize FlexSFs that do not conform to one of the seven different legacy UL-DL configurations) through system information block type1 (SIB1) information bits. The framework can maximize the reuse of existing UL/DL configurations, but the framework can be straightforwardly extended to support additional new UL-DL configurations. New UL-DL configurations may define new hybrid automatic repeat request-timing (HARQ-timing) relationship for both physical downlink shared channel (PDSCH) and physical uplink shared channel (PUSCH) transmission. In an example, the framework can support flexible subframe reconfiguration without any negative impact on the cell-specific reference signal-based (CRS-based) measurement accuracy of legacy UEs.

When the dynamically configured transmission direction of FlexSFs is different from the default configuration as indicated by SIB1, the FlexSFs may not be used and/or scheduled for legacy UEs. Advanced UEs can allow the node (e.g., eNB) to dynamically configure the FlexSFs to match the UL-DL configuration with the instantaneous traffic situation effectively. The advanced UEs can use UL-DL configurations beyond the seven legacy UL-DL configurations. The physical resource structure including the FlexSF and node scheduling can maintain the existing PDSCH timing, PUSCH-physical HARQ indicator channel (PUSCH-PHICH) timing, and UL grant timing relationships, thereby avoiding additional definitions of any new timing relationships to support the FlexSF. One approach to ensure backward compatibility and support for legacy measurements, including DL control (physical downlink control channel [PDCCH]) reception, may involve imposing restrictions such as only UL subframes may be used as FlexSFs and the resulting frame configuration from adaptive reconfiguration of one or more FlexSFs may belong to one of the seven type 2 frame structures of Table 1.

Figure 3:
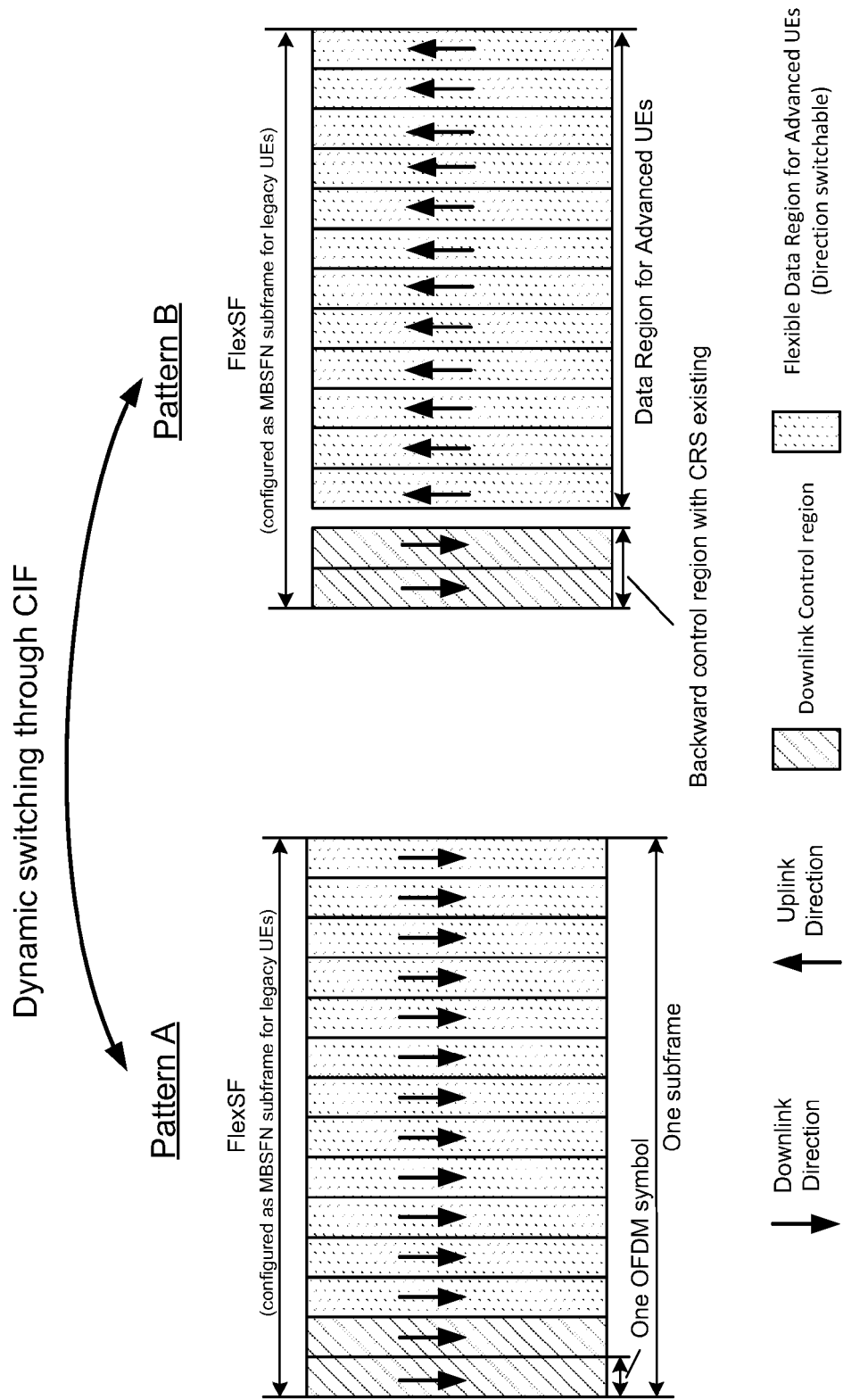
FIG. 3 illustrates a diagram of flexible subframe (FlexSF) structure to support bidirectional UL-DL switching in accordance with an example.

Another approach that allows bidirectional switching between UL-DL for a subframe while maintaining backward compatibility and co-existence with legacy UEs may be realized using multicast\broadcast single-frequency network-type (MBSFN-type) subframes, as shown in FIG. 3. FIG. 3 illustrates a flexible subframes with switchable transmission direction can be achieved with a "virtual" MBSFN setting. The data region in FlexSFs, when configured as MBSFN subframes for legacy UEs, can be dynamically configured as with a DL direction (Pattern A) or a UL direction (Pattern B) for advanced UEs through configuration indication field (CIF) signaling. A control region (e.g., the PDCCH or first two OFDM symbols) in the FlexSF may not change and may remain as DL control region to maintain the measure accuracy and backward compatibility. The data region (e.g., remaining 12 OFDM symbols for normal cyclic prefix) can switchably change transmission directions between UL and DL.

Figure 4:
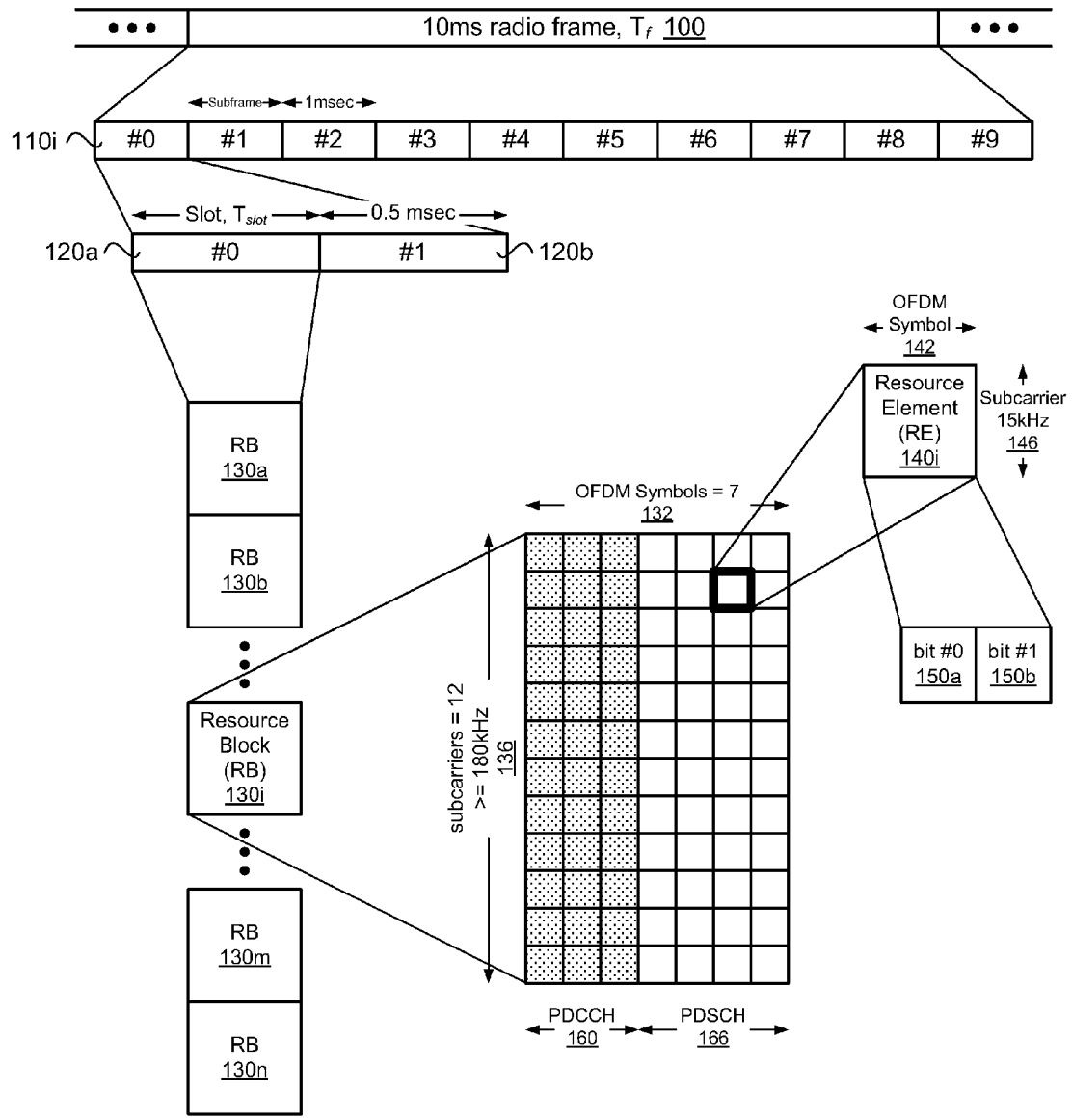
FIG. 4 illustrates a diagram of radio frame resources (e.g., a resource grid) for a downlink (DL) transmission in accordance with an example.

In one example, the legacy PDCCH and PDSCH can represent elements of a radio frame structure transmitted on the physical (PHY) layer in a downlink transmission between a node (e.g., eNodeB) and the wireless device (e.g., UE) using a generic long term evolution (LTE) frame structure, as illustrated in FIG. 4.

FIG. 4 illustrates a downlink radio frame structure type 2. In the example, a radio frame 100 of a signal used to transmit the data can be configured to have a duration, $T_f$, of 10 milliseconds (ms). Each radio frame can be segmented or divided into ten subframes 110$i$ that are each 1 ms long. Each subframe can be further subdivided into two slots 120$a$ and 120$b$, each with a duration, $T_{slot}$, of 0.5 ms. The first slot (#0) 120$a$ can include a legacy physical downlink control channel (PDCCH) 160 and/or a physical downlink shared channel (PDSCH) 166, and the second slot (#1) 120$b$ can include data transmitted using the PDSCH.

Each slot for a component carrier (CC) used by the node and the wireless device can include multiple resource blocks (RBs) 130$a$, 130$b$, 130$i$, 130$m$, and 130$n$ based on the CC frequency bandwidth. The CC can have a carrier frequency having a bandwidth and center frequency. Each subframe of the CC can include downlink control information (DCI) found in the legacy PDCCH. The legacy PDCCH in the control region can include one to three columns of the first OFDM symbols in each subframe or physical RB (PRB), when a legacy PDCCH is used. The remaining 11 to 13 OFDM symbols in the subframe may be allocated to the PDSCH for data (for short or normal cyclic prefix).

Each RB (physical RB or PRB) 130$i$ can include 12 15 kHz-subcarriers 136 (on the frequency axis) and 6 or 7 orthogonal frequency-division multiplexing (OFDM) symbols 132 (on the time axis) per slot. The RB can use seven OFDM symbols if a short or normal cyclic prefix (CP) is employed. The RB can use six OFDM symbols if an extended cyclic prefix is used. The resource block can be mapped to 84 resource elements (REs) 140$i$ using short or normal cyclic prefixing, or the resource block can be mapped to 72 REs (not shown) using extended cyclic prefixing. The RE can be a unit of one OFDM symbol 142 by one subcarrier (i.e., 15 kHz) 146.

Each RE can transmit two bits 150$a$ and 150$b$ of information in the case of quadrature phase-shift keying (QPSK) modulation. Other types of modulation may be used, such as 16 quadrature amplitude modulation (QAM) or 64 QAM to transmit a greater number of bits in each RE, or bi-phase shift keying (BPSK) modulation to transmit a lesser number of bits (a single bit) in each RE. The RB can be configured for a downlink transmission from the eNodeB to the UE, or the RB can be configured for an uplink transmission from the UE to the eNodeB.

Interference management (IM) in TDD-LTE systems can be used with adaptive UL-DL configurations, which can include flexible subframes. As discussed previously, adaptive UL-DL configurations in different cells (i.e., asymmetric UL-DL configurations) can lead to new interference types, such as UE-to-UE and node-to-node interference. Of the various interference types, the case of DL→UL interference (e.g., node-to-node interference) can be a more significant form of interference that, if not handled effectively, can reduce the performance improvements from adapting UL-DL configurations to match traffic conditions in respective cells.

To address the DL→UL interference while maximizing the overall system performance, various IM principles can be used. For example, DL signal-to-noise-and-interference ratio (SINR) can be less sensitive to UL interference and UL SINR can be more sensitive to DL interference, especially from DL interference caused by a macro cell. The macro node can use flexible subframes (FlexSF), also referred to as interference management subframes (IMS), either with reduced DL transmit power or configured as UL subframe, when the macro DL causes severe interference to neighboring cells or a majority of small cells' UL FlexSF within the macro cell coverage area. Alternatively, the small cell (e.g, femto cell or pico cell) can use FlexSF either with a reduced DL transmit power or configured as UL subframe when the small cell causes severe interference to neighboring the small cells' UL FlexSF within the small cell's coverage area or the macro cell's coverage area. The IM principles can be used to help determine when a macro node or low power node (LPN) may configure a FlexSF as a DL subframe or not configure the FlexSF as a DL subframe and with what DL transmit power level, by considering the impact of interference generated to any nearby cells that may be operating in UL mode.

IM clustering can be an IM mechanism to mitigate node-to-node interference. In IM clustering, the entire network can be divided into a number of clusters of cells that can be considered as isolated (de-coupled) from each other. The cells within each cluster can use a same TDD configuration that is adapted according to the traffic conditions within the cluster, while the cells in different clusters may have UL-DL subframe configurations that are independent of other clusters.

Figure 5:
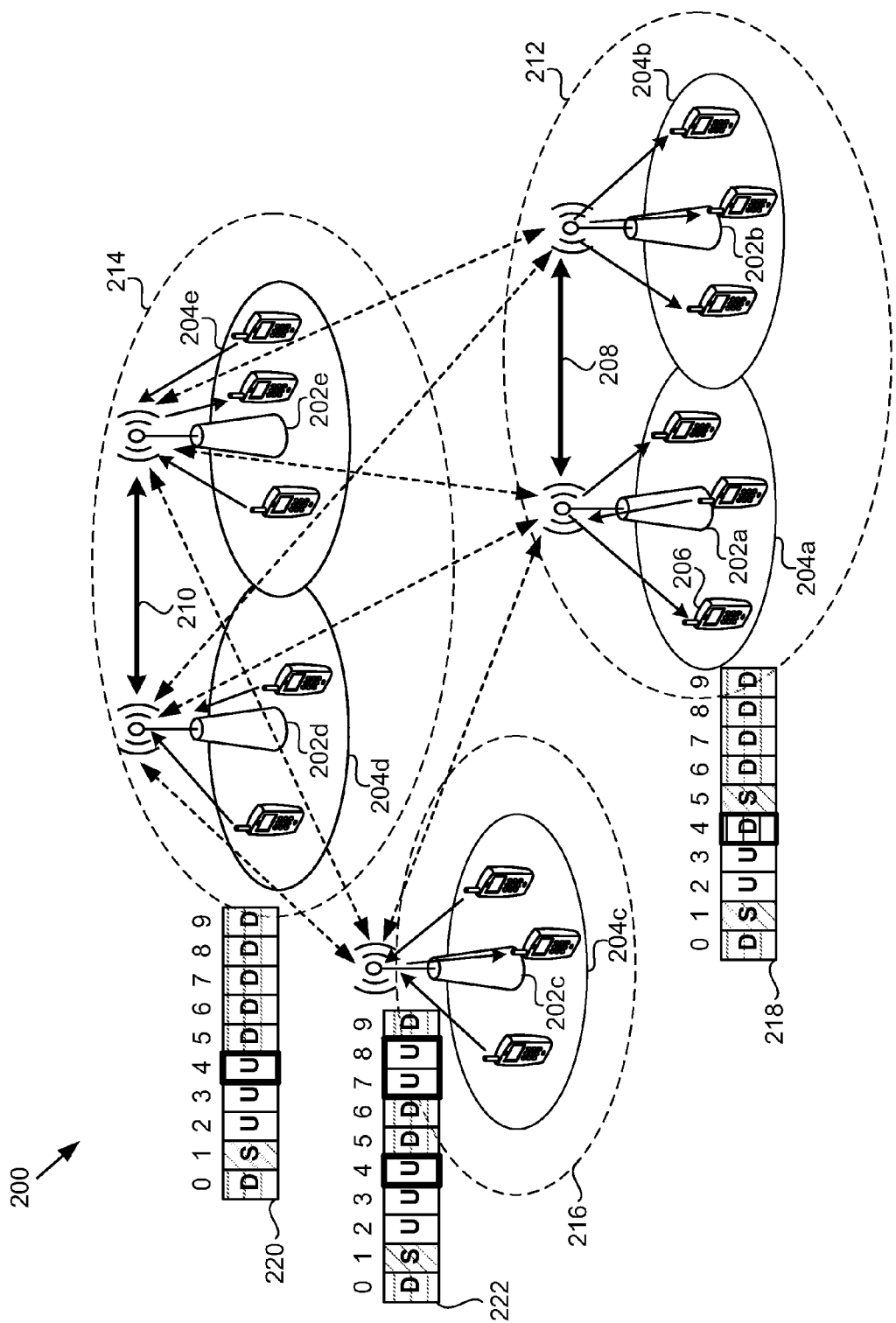
FIG. 5 illustrates a block diagram of interference management (IM) clusters in accordance with an example.

FIG. 5 depicts the formation of multiple clusters based on coupling levels between nodes. As used herein, the term coupling interference, coupling level, and/or interference level refers to a measurement of a DL transmission by one node at another node, which can be a measurement of potential interference. FIG. 5 illustrates five different LPNs 202a-e with their corresponding cell coverage areas 204a-e. However, any number of nodes and combinations of LPNs and macro nodes can be used. Additionally, a coupling level between each pair of nodes is shown. Coupling levels above a coupling threshold are depicted by solid, bold arrows 208, 210. Coupling levels not above the coupling threshold are depicted as thin, dashed arrows. The coupling threshold can be set at a predetermined level at which a potential for node-to-node and UE-to-UE interference can begin to be significant. In an example, the coupling threshold can be determined by a SINR.

The two coupling levels above a coupling threshold 208, 210 can be the basis for forming a first cluster 212 with the first node 202a and the second node 202b and a second cluster 214 with the fourth node 202d and the fifth node 202e. Since no coupling level above the coupling threshold exists between the third node 202c and any other nodes, a third cluster 516, with a single node, can be formed. Each cluster can have a different UL-DL/TDD configuration, as indicated by the first UL-DL/TDD configuration 218 (corresponding to UL-DL/TDD configuration #4 in Table 1) for the first cluster 212, the second UL-DL/TDD configuration 220 (corresponding to UL-DL/TDD configuration #3 in Table 1) for the second cluster 214, and the third UL-DL/TDD configuration 222 (corresponding to UL-DL/TDD configuration #6 in Table 1) for the third cluster 216.

The three clusters are depicted at the fifth timeslot/subframe (labeled #4), where potential conflicts in directional traffic exist, but interference problems can be mitigated by the formation of different clusters. Potential conflicts can also exist on the eighth and ninth sub-frames (labeled #7 and #8, respectively). The formation of several different clusters allows the wireless wide area network (WWAN) 200 to adapt in near real time to differing directional transmission traffic loads within the different clusters. Differing traffic loads can be depicted by differing numbers of arrows from UEs to nodes and from nodes to UEs 206 depicting differing relative demands for UL and DL transmissions respectively. The various UL-DL/TDD configurations 218, 220, and 222 can be modified to meet these demands for UL and DL transmissions.

To facilitate the determination of UL-DL/TDD configurations 218, 220, and 222, nodes can communicate their directional traffic needs between one another over low-latency backhaul infrastructure. Individual nodes within a cluster can be configured to send traffic direction information about traffic direction needs and receive such traffic direction information. Decisions about a common UL-DL/TDD configuration or a restricted set of UL-DL configurations for a cluster 212, 214, and 216 can be made on the basis of joint UL and DL needs throughout the cluster and/or splitting differences between UL and DL traffic demands at individual nodes in the cluster.

Decisions about UL-DL/TDD configurations can be made at individual nodes and/or at a network level. Determinations for UL-DL/TDD configurations for different clusters can be continually made and updated independent of one another to respond to dynamically changing directional traffic loads monitored within individual clusters.

As described, an isolated cluster can be a group of cells (or cluster) for which the DL and UL performance (e.g. SINR) of the cells in the cluster are not deemed sensitive to the transmission direction of neighboring cells outside the cluster (in other clusters), and the change of transmission direction in the cells of the cluster may not degrade performance of the neighboring cells outside the cluster (in other clusters). Clusters can be merged into a bigger cluster, when isolated clusters overlap with one or more cells being common to both clusters. Clusters can be split into smaller clusters, when a group of cells within the cluster are no longer sensitive to the transmission direction of other groups of cells within the cluster.

The identification of the IM clusters may be based on comparing pathloss values corresponding to the node-to-node channels between different cells to a pre-determined threshold, which may be cell-specific. In an example, the configurations of the IM clusters can be updated in a semi-static manner. In another example, the configurations of an IM cluster or a subset of the IM cluster can change dynamically based on the traffic conditions in the cells. For instance, a single cluster may be de-coupled into two or more subclusters if certain cells that couple these smaller clusters are deactivated (e.g., have no active traffic). In another configuration, IM clustering can be extended to include semi-static coordination between IM clusters and dynamic coordination between sub-clusters within an IM cluster.

In an example to generate the IM cluster, each node can search for neighboring nodes and acquire time and frequency synchronization with a neighboring cell in a same frequency and detect the neighboring cell identifier (ID) using synchronization signals received previously at power-up. Time and frequency synchronization information about neighboring nodes may also be made available at each node via information exchange over the backhaul. The node can perform corresponding reference signal received power (RSRP) and/or reference signal received quality (RSRQ) measurements for each neighboring cell detected. In an example, the RSRP and/or RSRQ measurements can be taken in fixed subframes to allow backward compatibility and allow for use of flexible subframes. Each node can generate a measurement report and send the measurement report to other neighboring nodes or a network entity (e.g., central processing module [CPM], centralized processing unit, or a specified node). The network entity (NE) can be assigned to generate IM clusters and/or coordinate UL-DL configurations between cells. The measurement report can include a neighboring cell's physical-layer cell identity (PCI), a RSRP value, and/or a RSRQ value. The NE can receive the measurement results reported from neighboring nodes to generate isolated cell identification (ICI) and determine whether to support UL-DL configuration functionality at the neighboring nodes, where neighboring nodes can be triggered automatically (i.e., automatic UL-DL reconfiguration). The NE can calculate and/or determine an UL-DL configuration indication status and send an UL-DL configuration indication to a neighboring node and neighboring cells when the UL-DL configuration indication is changed compared with previous states based on the output of automatic UL-DL configuration function. The UL-DL configuration indication can be used to inform the neighboring node that UL-DL reconfiguration functionality is enabled or disabled. The neighboring node can set the UL-DL reconfiguration enable or disable decision based on the UL-DL configuration indication received from NE.

As illustrated, to obtain RSRP-type information for node-to-node channels, some timing coordination may be used for one cell to make RSRP-type measurements on the cell's uplink from the cell's neighboring cells. More specifically, certain subframes may be configured to be in UL mode in the measuring cell while the cell to be measured operates in DL mode. Then, once synchronization is achieved, CRS (or channel state information reference signals [CSI-RS]) based pathloss estimation may be utilized by the measuring cell to estimate the pathloss. In an example, coordination between neighboring nodes can be facilitated via network coordination (e.g., NE). A cell can in a measuring mode when the cell does not have an active load. Pathloss measurements from a cell may be performed while the cell is in DL mode (transmitting either regular or MBSFN subframes), while the measuring cell can be in UL mode during the measurements. Information regarding the synchronization signals, CRS ports, CSI-RS resources, and/or transmit power information can be conveyed to the measuring cell via the backhaul (X2 and/or point-to-point fiber connection). Further coordination between the cells in the IM cluster may be used as well, such as exchange of information regarding traffic conditions or a preferred UL-DL configuration. Alternatively, pathloss measurements between neighboring nodes may be done with additional signaling that can be defined specifically for IM clustering or can be implemented using a vendor specific procedure and/or protocol.

Moreover, for the above-defined clusters of cells operating in DL mode, the DL throughput performance may be further improved by using an appropriate DL Coordinated Multi-Point (CoMP) technique within the IM cluster depending on the loading and interference conditions within the IM cluster. However, depending on the IM cluster and the DL CoMP measurement set sizes, the configuration of the CoMP set may, in general, be independent of the configuration of the IM cluster. Similarly, eICIC techniques may also be used in conjunction with IM methods (e.g., IM clustering) to further improve the performance via static and/or semi-static coordination of macro transmissions over a larger network area.

A Coordinated MultiPoint (CoMP) system may be used to reduce interference from neighboring nodes in both homogeneous networks and HetNets. In the Coordinated MultiPoint (CoMP) system, the nodes, referred to as cooperating nodes, can also be grouped together with other nodes where the nodes from multiple cells can transmit signals to the wireless device and receive signals from the wireless device. The cooperating nodes can be nodes in the homogeneous network or macro nodes and/or lower power nodes (LPN) in the HetNet. CoMP operation can apply to downlink transmissions and uplink transmissions.

Downlink CoMP operation can be divided into two categories: coordinated scheduling or coordinated beamforming (CS/CB or CS/CBF), and joint processing or joint transmission (JP/JT). With CS/CB, a given subframe can be transmitted from one cell to a given wireless device (e.g., UE), and the scheduling, including coordinated beamforming, is dynamically coordinated between the cells in order to control and/or reduce the interference between different transmissions. For joint processing, joint transmission can be performed by multiple cells to a wireless device (e.g., UE), in which multiple nodes transmit at the same time using the same time and frequency radio resources and/or dynamic cell selection.

Two methods can be used for joint transmission: non-coherent transmission, which uses soft-combining reception of the OFDM signal; and coherent transmission, which performs precoding between cells for in-phase combining at the receiver. By coordinating and combining signals from multiple antennas, CoMP, allows mobile users to enjoy consistent performance and quality for high-bandwidth services whether the mobile user is close to the center of a cell or at the outer edges of the cell.

Uplink CoMP operation can be divided into two categories: joint reception (JR) and coordinated scheduling and beamforming (CS/CB). With JR, a physical uplink shared channel (PUSCH) transmitted by the wireless device (e.g., UE) can be received jointly at multiple points at a time frame. The set of the multiple points can constitute the CoMP reception point (RP) set, and can be included in part of UL CoMP cooperating set or in an entire UL CoMP cooperating set. JR can be used to improve the received signal quality. In CS/CB, user scheduling and precoding selection decisions can be made with coordination among points corresponding to the UL CoMP cooperating set. With CS/CB, PUSCH transmitted by the UE can be received at one point.

Figure 6A:
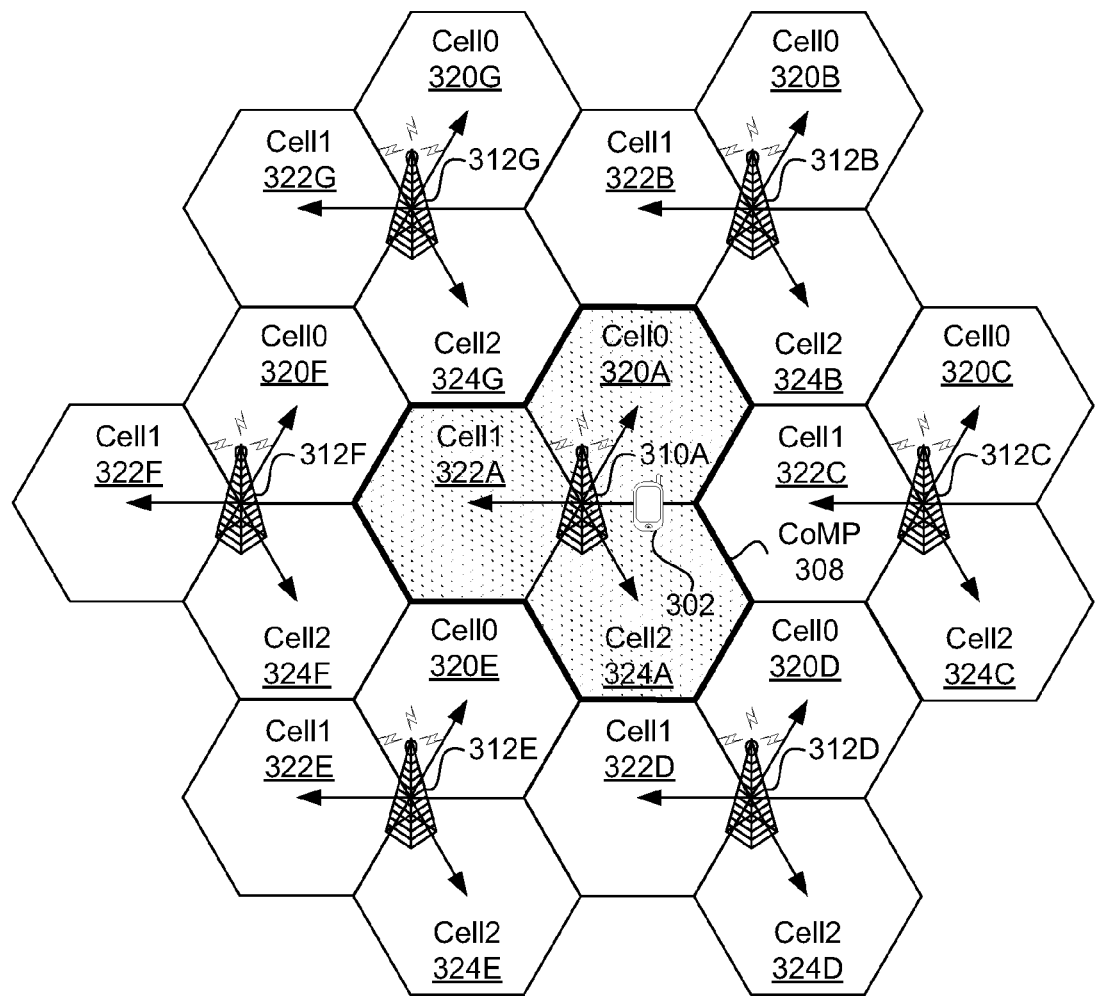
FIG. 6A illustrates a block diagram of a homogenous network using an intra-site coordinated multipoint (CoMP) system (e.g., CoMP scenario 1) in accordance with an example.

FIG. 6A illustrates an example of a coordination area 308 (outlined with a bold line) of an intra-site CoMP system in a homogenous network, which can illustrate LTE CoMP scenario 1. Each node 310A and 312B-G can serve multiple cells (or sectors) 320A-G, 322A-G, and 324A-G. The cell can be a logical definition generated by the node or geographic transmission area or sub-area (within a total coverage area) covered by the node, which can include a specific cell identification (ID) that defines the parameters for the cell, such as control channels, reference signals, and component carriers (CC) frequencies. By coordinating transmission among multiple cells, interference from other cells can be reduced and the received power of the desired signal can be increased. The nodes outside the CoMP system can be non-cooperating nodes 312B-G. In an example, the CoMP system can be illustrated as a plurality of cooperating nodes (not shown) surrounded by a plurality of non-cooperating nodes.

Figure 6B:
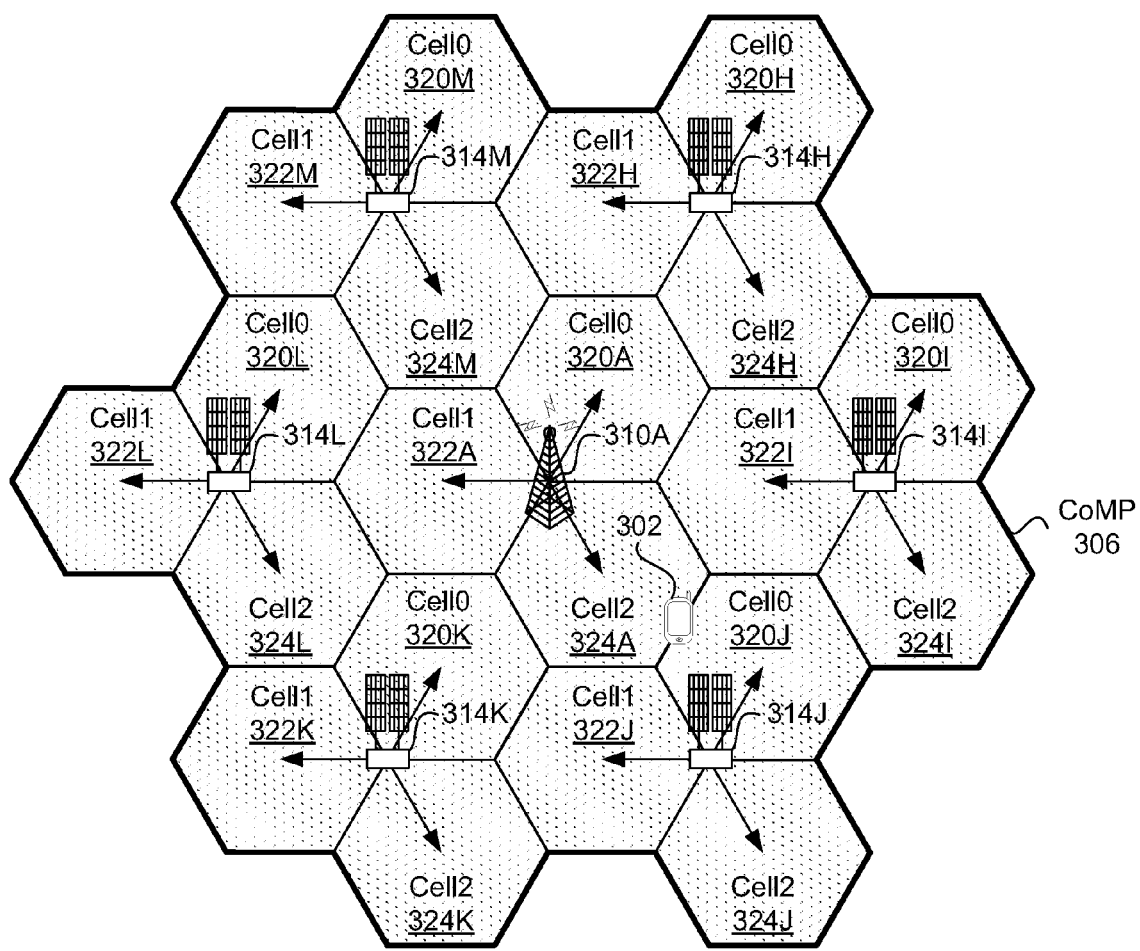
FIG. 6B illustrates a block diagram of a homogenous network with high transmission power using an inter-site coordinated multipoint (CoMP) system (e.g., CoMP scenario 2) in accordance with an example.

FIG. 6B illustrates an example of an inter-site CoMP system with high power remote radio heads (RRHs) in a homogenous network, which can illustrate LTE CoMP scenario 2. A coordination area 306 (outlined with a bold line) can include eNBs 310A and RRHs 314H-M, where each RRH can be configured to communicate with the eNB via a backhaul link (optical or wired link). The cooperating nodes can include eNBs and RRHs. In a CoMP system, the nodes can be grouped together as cooperating nodes in adjacent cells, where the cooperating nodes from multiple cells can transmit signals to the wireless device 302 and receive signals from the wireless device. The cooperating nodes can coordinate transmission/reception of signals from/to the wireless device 302 (e.g., UE). The cooperating node of each CoMP system can be included in a coordinating set.

Figure 6C:
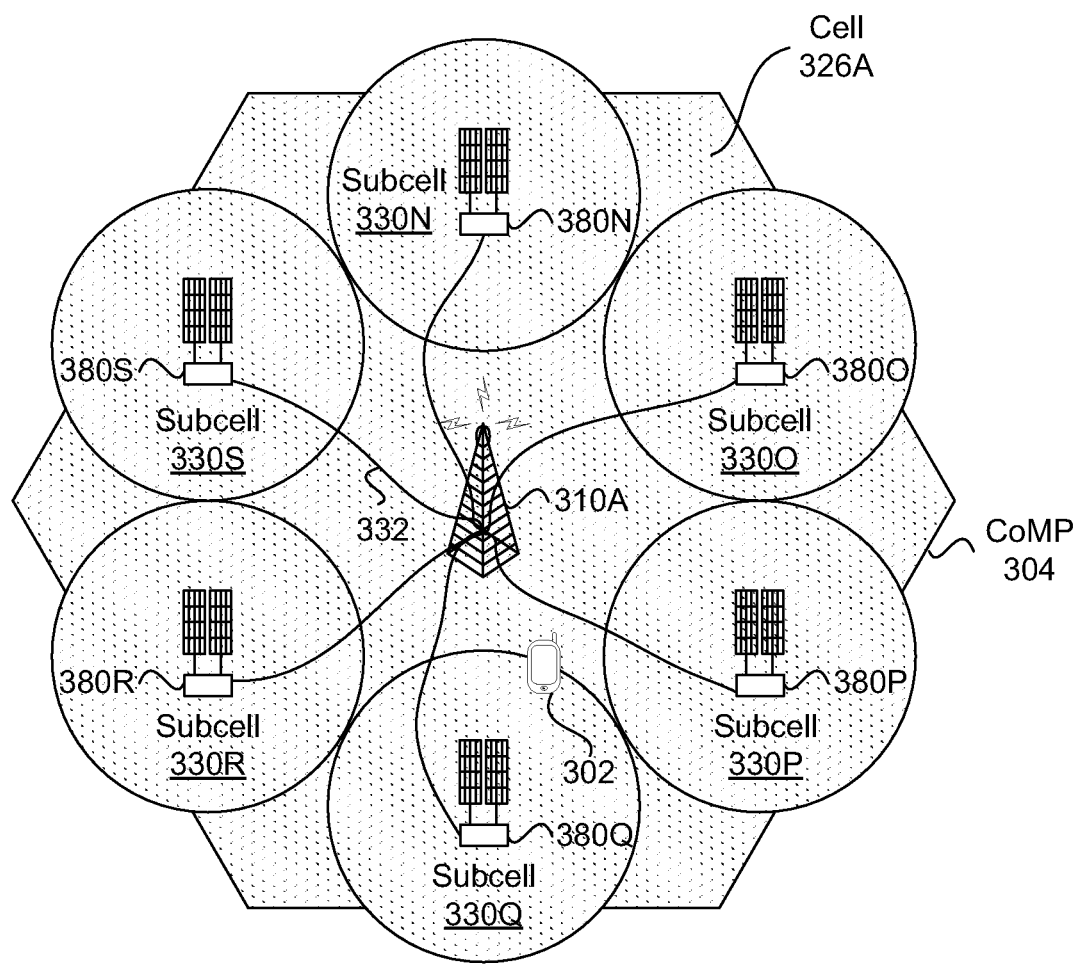
FIG. 6C illustrates a block diagram of a coordinated multipoint (CoMP) system in a heterogeneous network with low power nodes (e.g., CoMP scenario 3 or 4) in accordance with an example.

FIG. 6C illustrates an example of a CoMP system with low power nodes (LPNs) in a macro cell coverage area. FIG. 6C can illustrate LTE CoMP scenarios 3 and 4. In the intra-site CoMP example illustrated in FIG. 6C, LPNs (or RRHs) of a macro node 310A may be located at different locations in space, and CoMP coordination may be within a single macrocell. A coordination area 304 can include eNBs 310A and LPNs 380N-S, where each LPN can be configured to communicate with the eNB via a backhaul link 332 (optical or wired link). A cell 326A of a macro node may be further sub-divided into sub-cells 330N-S. LPNs (or RRHs) 380N-S may transmit and receive signals for a sub-cell. A wireless device 302 can be on a sub-cell edge (or cell-edge) and intra-site CoMP coordination can occur between the LPNs (or RRHs) or between the eNB and the LPNs. In CoMP scenario 3, the low power RRHs providing transmission/reception points within the macrocell coverage area can have different cell IDs from the macro cell. In CoMP scenario 4, the low power RRHs providing transmission/reception points within the macrocell coverage area can have a same cell ID as the macro cell.

A network can support frequency domain inter-cell interference coordination (ICIC) or time domain enhanced ICIC (eICIC). In an example, ICIC can be used to decrease interference between neighboring cells or nodes (e.g., coordination nodes or cooperation nodes) by lowering the power of a part of the subchannels in the frequency domain which then can be received close to the node. The subchannels do not interfere with the same subchannels used in neighboring cells and thus, data can be sent to wireless devices that are close to the cell with less interference on these subchannels.

Another ICIC technique is enhanced ICIC (eICIC) used in the time domain for heterogeneous networks (HetNets), where a high power macro cell can be complemented with low power nodes such as pico cells (hotspots in shopping centers or at airports) or femto cells (hotspots in small areas such as homes or businesses). The low power nodes can exist inside a macro cell coverage area. The macro cell can transmit long range high power signals, and the low power nodes can transmit low power signals over short distances. In an example to mitigate interference between the macro cell and the several low power nodes located within the macro cell coverage area, eICIC can coordinate the blanking of sub-frames in the time domain in the macro cell by using MBSFN-type subframes. As used herein, a cell can refer to the node (e.g., eNB) configured to communicate with wireless devices within a geographic region that is referred to as a cell coverage area.

In another example, the backhaul link can be used to inform the victim cell (e.g., operating in UL mode) of partial or full information regarding the transmissions from a coupled aggressor cell (e.g., operating in DL mode), such that the victim cell may partially or completely cancel the interference from the aggressor cell's DL transmission first before decoding the UL transmissions from UEs in the victim cell via successive interference cancellation. Alternatively in a case of centralized processing, centralized radio access network (GRAN or C-RAN) based network architecture remote radio heads (RRHs) can be connected directly to a centralized processing module (CPM) or centralized processing unit (e.g. using optical, wired, or wireless link) where information about a transmit signal for set of RRHs and/or macro cells can be available and can be utilized for compensation of inter-cell interference between RRHs and/or eNBs (i.e., between different types of cells having opposite transmission directions).

Figure 7:
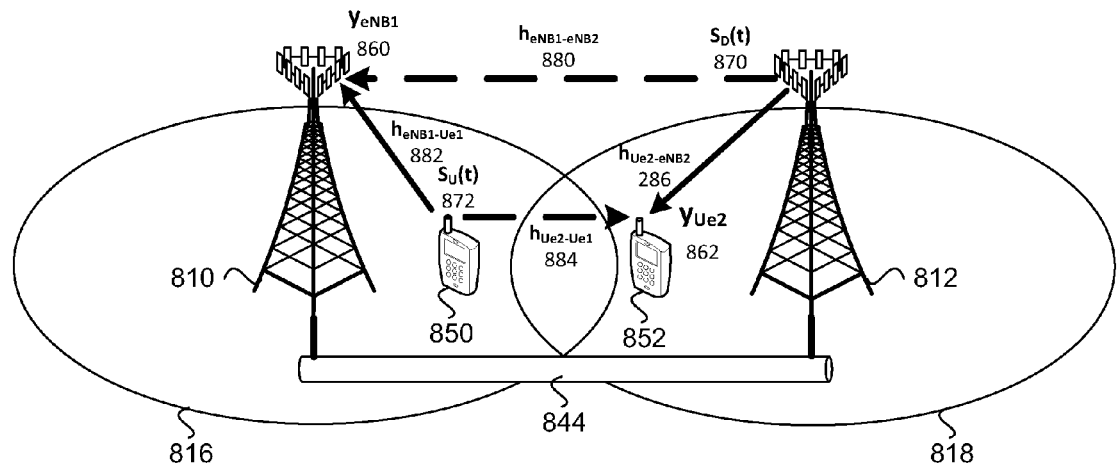
FIG. 7 illustrates a block diagram of an aggressor node transmitting a downlink signal, a wireless device transmitting an uplink signal, and a victim node in accordance with an example.

FIG. 7 illustrates an example of inter-node interference 880 (including inter-cell interference) between nodes 810 and 812 (e.g., node-to-node interference) and inter-user interference 884 between users or wireless devices 850 and 852 (e.g., UE-to-UE interference) for a homogeneous network deployment scenario. The different types of interference, including inter-cell interference and inter-user interference, if not account for, may limit the potential benefits of adapting TDD systems to dynamic traffic conditions.

Due to the relatively high transmission power of the nodes, inter-cell interference (e.g., node-to-node interference) can be a severe problem. For example, the propagation characteristics between nodes (e.g., macro nodes) can be line-of-sight (LOS) with a transmit power approximately 25-30 decibels (dB) higher than the power of a user terminal or a wireless device. The decibel (dB) is a logarithmic unit that indicates the ratio of a physical quantity (usually power or intensity) relative to a specified or implied reference level. Thus, the power level of a received uplink signal 872 from the wireless device 850 can be less than the power of the inter-node interference signal 870 from the aggressor node. Synchronous TDD networks using the same synchronous TDD configuration over the whole network has been used to avoid inter-node interference.

Inter-node interference can be compensated for or cancelled at a receiving node (e.g., victim node or an uplink node) allowing for asymmetrical DL and UL configurations across the multi-cell environment with reduced interference and greater efficiency of TDD networks. A node (e.g., eNB) can be either a victim node or an aggressor node based on the DL or UL configuration of the node at a specified time interval. For example, if at one time interval, the node 810 is receiving an uplink (UL) transmission from a wireless device 850 while another node 812 is transmitting a downlink (DL) transmission, the node can be referred to as a victim node or an uplink node. If at another time interval, the node 812 is transmitting a DL transmission to a wireless device 852 while another node 810 is receiving an UL transmission, the node can be referred to as an aggressor node or a downlink node.

In an example, the victim node 810 can receive DL signal information from an aggressor node 812 via a backhaul communication link 844, such as X2 signaling via a wired connection or an optical fiber connection. At the victim node, a channel impulse response 880 for a channel between the aggressor node and the victim node can be estimated using the downlink signal information. An inter-node interference signal for the channel can be estimated using the downlink signal information and the channel impulse response. The victim node can receive an uplink signal 860 from a wireless device 850 after the downlink signal information of the aggressor node is received and the inter-node interference signal is estimated. The estimated inter-node interference signal can be subtracted from the uplink signal to form an inter-node interference compensated uplink signal, which can substantially cancel the inter-node interference from the aggressor node in the uplink signal thus allowing a reliable and high throughput transmission between the victim node and wireless device.

Although, FIG. 7 illustrates a homogeneous network, the methods, systems, devices, and interference described herein can also be applicable to heterogeneous networks. In another example, such as in a centralized radio access network (C-RAN) or a HetNet, inter-node interference cancellation can be provided by at a central processing module (CPM). In an example the CPM can be used as a baseband unit (BBU) for multiple stations of the network.

Figure 8:
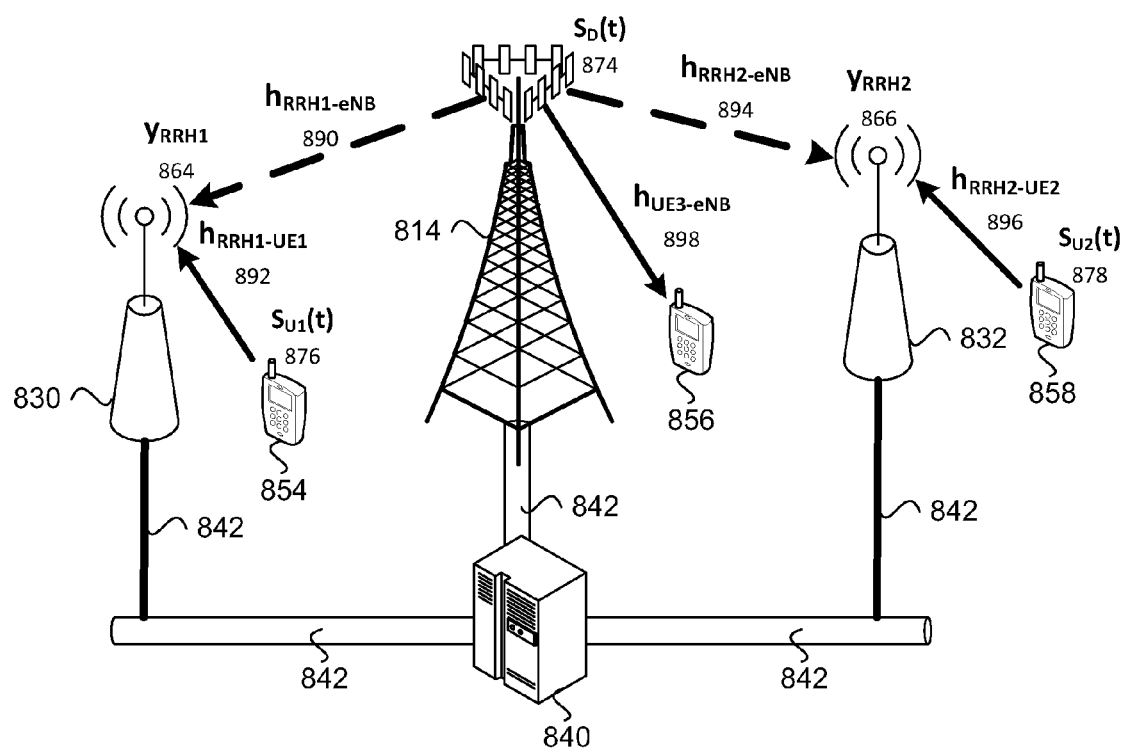
FIG. 8 illustrates a block diagram of a downlink node transmitting a downlink signal, a wireless device transmitting an uplink signal, and an uplink node in a heterogeneous network (HetNet) in accordance with an example.

FIG. 8 illustrates a CPM 840 in communication with a macro node 814 and low power nodes (LPNs) 830 and 832 via a backhaul communication link 842, such as X2 signaling (or other vendor specific connections and protocols) via a wired connection or an optical fiber connection. The CPM can generate a downlink signal for a downlink node 814. The CPM can estimate a channel impulse response 890 for a channel between the downlink node and an uplink node 830 using the downlink signal transmitted by the downlink node. The CPM can determine an inter-node interference signal for the channel using the downlink signal and the channel impulse response. The downlink signal 874 can be transmitted via the downlink node. The CPM can receive an uplink signal 864 from a wireless device via the uplink node at a substantially same time as the downlink signal is transmitted. The received inter-node interference signal can be subtracted from the uplink signal to form an inter-node interference compensated uplink signal to substantially cancel the inter-node interference from the downlink node in the uplink signal.

Inter-node interference cancellation can provide a mechanism to cancel, reduce, or possibly even eliminate inter-node interference in TDD networks for dynamic non-aligned DL/UL frame configurations between nodes or cells. Additionally, inter-node interference cancellation can be used to provide coexistence of TDD and FDD networks.

Referring back to FIG. 7 of a homogeneous network deployment operating in dynamic TDD mode at a specified time interval, a victim node 810 in a victim node cell area 816 can be in proximity to an aggressor node 812 in an aggressor node cell area 818. Inter-node interference cancellation can be provided for the victim node operating in UL (victim cell) and the aggressor node operating in DL (aggressor cell). The uplink signal received 860 by the victim node can be represented by $y_{eNB_1}(t) = h_{eNB_1\text{-}UE_1}\otimes s_U(t) + h_{eNB_1\text{-}eNB_2}\otimes s_D(t) + n(t)$
where $s_U(t)$ 872 is an uplink signal transmitted by a victim cell wireless device (i.e., a wireless device) 850 to the victim node, $s_D(t)$ 870 is a downlink signal transmitted by the aggressor node to an aggressor cell wireless device (i.e., a second wireless device) 852, n(t) is additive noise from other sources, $h_{eNB_1\text{-}UE_1}$ 882 is a channel impulse response between the victim cell wireless device and the victim node, $h_{eNB_1\text{-}eNB_2}$ 880 is a channel impulse response between the aggressor node and the victim node.

FIG. 7 also illustrates a downlink signal received 862 by the aggressor cell wireless device, including the downlink signal with the channel impulse response 886 between the aggressor cell wireless device and the aggressor node, and the uplink signal acting as interference with the channel impulse response 884 between the victim cell wireless device and the aggressor cell wireless device.

Without interference, the uplink signal received can be represented by $h_{eNB_1\text{-}UE_1}\otimes s_U(t)$, the linear convolution of the channel impulse response between the victim cell wireless device and the victim node combined with the uplink signal transmitted by a victim cell wireless device. The power of the interference signal $h_{eNB_1\text{-}eNB_2}\otimes s_D(t)$ generated by the aggressor node can be much higher than the power of the useful uplink signal $h_{eNB_1\text{-}UE_1}\otimes s_U(t)$. Removing the additive term $h_{eNB_1\text{-}eNB_2}\otimes s_D(t)$ of the inter-node interference signal from a neighboring node (e.g., aggressor node) can allow the victim node to successfully receive the uplink signal $s_U(t)$ in some scenarios.

The interfering node (i.e., aggressor node) 812 can provide, over the backhaul link 844, the downlink signal information on the transmitted signal 870 to the receiving node (i.e., victim node) 810. Both the interfering node and the receiving node can receive the downlink signal information from each other since, both nodes can provide downlink transmission at different intervals of time. The downlink signal information exchange may be implemented in different ways. In one embodiment, the downlink signal information may include a direct waveform $s_D(t)$ 870.

In another embodiment, the downlink signal information may include the specific information used to reconstruct the transmitted waveform $s_D(t)$ at the victim node. Such specific information may include information bits, a resource allocation, a multiple input multiple output (MIMO) transmission mode, a modulation and code rate, and combination of this specific information. The signal transmitted by aggressor node can become fully or partially known and available at the victim node.

Once the transmitted inter-cell interference waveform $s_D(t)$ 870 is available at the victim node 810, the victim node may use the inter-cell interference waveform to estimate the channel impulse response $h_{eNB_1\text{-}eNB_2}$ 880 or channel transfer function between the victim node and the aggressor node. The channel estimation accuracy of the channel impulse response can be very high due to a large processing gain which comes from a knowledge of the transmitted waveform $s_D(t)$. Alternatively, channel estimation may be performed with addition information provided by reference signals (RS) or synchronization signals in the system, or the channel estimate may be provided by the network when the channel estimate was previously measured.

The victim node 810 can estimate or reconstruct the received inter-cell interference signal $h_{eNB_1\text{-}eNB_2}\otimes s_D(t)$ and subtract the inter-cell interference signal from the received signal $y_{eNB_1}(t)$ 860, thus suppressing the inter-cell interference. When the inter-cell interference channel estimation can be accurately estimated, the inter-node interference compensated uplink signal at the victim node $x_{eNB_1}(t)$ may be represented by:

$$x_{eNB_1}(t) = y_{eNB_1}(t) - h_{eNB_1\text{-}eNB_2}\otimes s_D(t) = h_{eNB_1\text{-}UE_1}\otimes s_U(t) + n(t),$$
which can
substantially cancel the inter-node interference from the aggressor node in the uplink signal.

Thus, inter-node interference cancellation can remove most of the inter-node interference, which can make the reception of the uplink signal feasible in an asymmetric UL-DL configuration between neighboring nodes. Inter-node interference cancellation can provide the TDD networks an additional option to dynamically control the TDD configuration in each cell of the network based on the instantaneous DL and UL traffic asymmetry.

Inter-node interference cancellation can be used in HetNets or a centralized, cooperative, or cloud radio access network (GRAN or C-RAN), where the node functionality can be subdivided between a baseband unit (BBU) processing pool and a remote radio unit (RRU) or a remote radio head (RRH) with optical fiber connecting the BBU to the RRU. The C-RAN can provide centralized processing, co-operative radio, and a real-time cloud infrastructure RAN.

Figure 9:
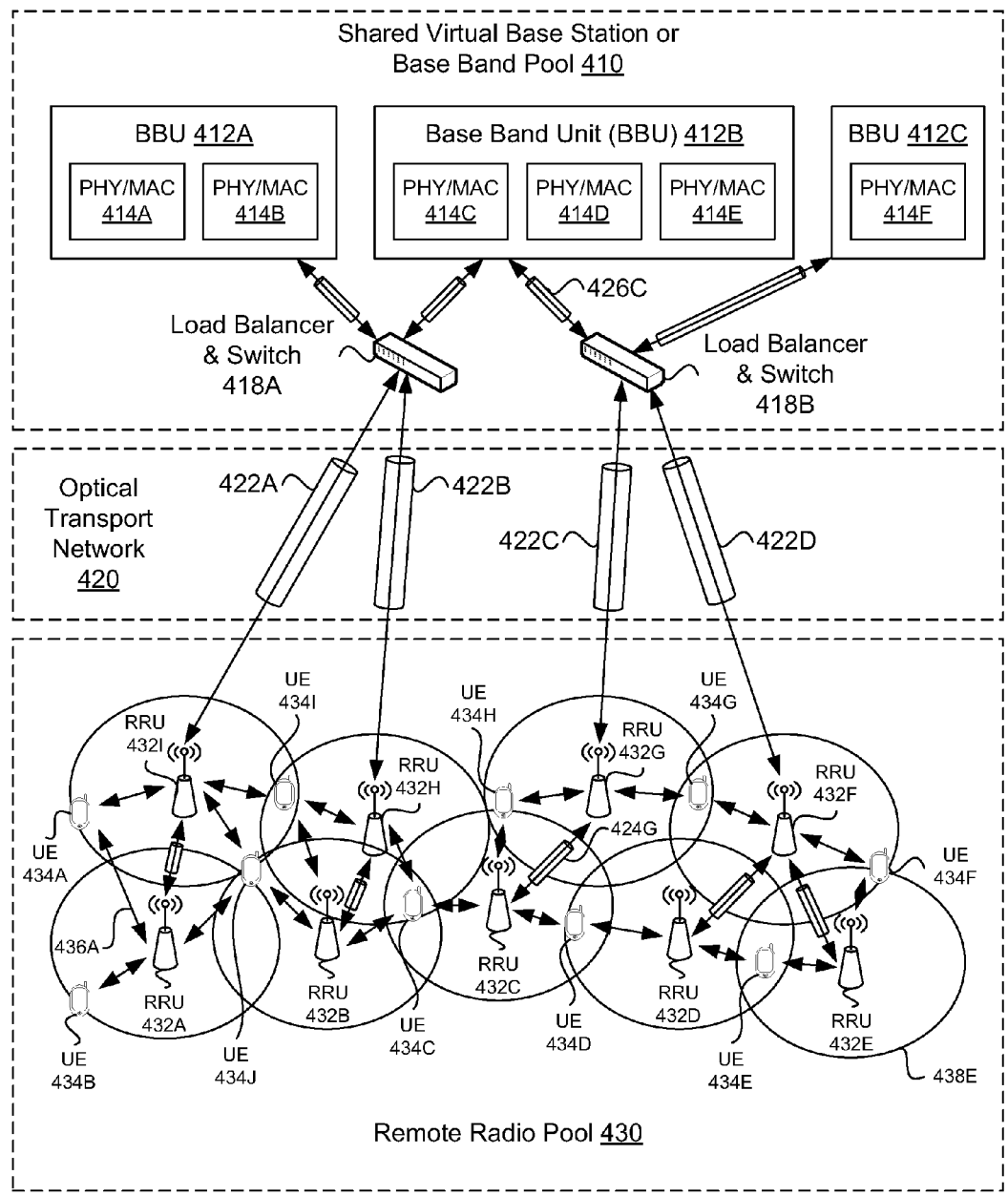
FIG. 9 illustrates a block diagram of a baseband unit (BBU) and a remote radio unit (RRU) configuration of a centralized radio access network (C-RAN) in accordance with an example.

As illustrated in FIG. 9, the C-RAN can be composed of three parts: a remote radio pool 430 equipped by remote radio units (RRUs) 432A-I with antennas, a shared virtual base station or a baseband processing pool 410 including baseband units (BBUs) 412A-C, and a fiber or cable 422A-D and 424G in a physical transport network 420 connecting at least one of the RRUs in the remote radio pool to at least one of the BBUs in the baseband pool. The baseband processing pool can be centralized. Each BBU can include a high-performance general purpose processor, a real-time virtualization processor, and/or a physical (PHY) layer processor and/or a MAC layer processor 414A-F. The BBUs can be coupled to a load balancer and switch 418A-B via electrical or optical cabling 426C. The physical transport network can be a low-latency transport network, a bandwidth-efficient network, and/or an optical transport network 420 using optical fiber or optical cabling.

In another example, the physical transport network can be a high speed electrical transport network. The physical transport network can provide a physical communication link between the BBU and the RRU. The physical communication link can include an optical fiber link or a wired electrical link.

The BBU can be referred to as a radio element controller (REC). The RRU can be referred to as a remote radio head (RRH), a remote radio equipment (RRE), a relay station (RS), or a radio equipment (RE). Each RRU can be separated from the BBU by a selected distance. Each RRU can include a sector, cell, or coverage area 438E for a wireless device, such as a user equipment (UE) 434A-J, where the wireless device may be located within multiple sectors, cells, or coverage areas. The distributed RRUs of the C-RAN can provide a RAN with high capacity and a wide coverage area.

RRUs 432A-I can be smaller, easier to install, easier to maintain, and consume less power than the BBUs 412A-C. The baseband processing pool 110 can aggregate the processing power of the BBU through real-time virtualization technology and provide the signal processing capacity to the virtual BTSs or RRUs in the pool. The physical transport network can distribute the processed signals to the RRUs in the remote radio pool 430. The centralized BBU pool can reduce the number of node rooms used for BBUs and can make resource aggregation and large-scale cooperative radio transmission/reception possible. The C-RAN can dynamically switch a serving gateway's (S-GW) connectivity from a first BBU to a second BBU in the BBU pool. In another example, the C-RAN can dynamically switch a BBU's connectivity from a first RRU to a second RRU in the RRU pool.

Referring back to FIG. 8, a heterogeneous network deployment operating in dynamic TDD mode at a specified time interval can provide the inter-node interference cancellation in HetNets and/or a C-RAN. Inter-node interference cancellation can apply to nodes in a heterogeneous cooperative network with a central processing module (CPM) or centralized processing unit and remote radio heads (or macro node or LPNs).

In an example, the CPM can be used as a baseband unit (BBU) for multiple stations of the network. When the CPM is used, a backhaul link for transmitting downlink signal information to an uplink node may not be needed and processing, such as construction of a transmit waveform, inter-node channel estimation, and subtraction of the inter-node interference signal from the received uplink signal, may be directly implemented at the CPM, which may also control operation of several cells, nodes, or remote radio heads (RRH).

FIG. 8 illustrates a CPM 840 in communication with a macro node 814 and low power nodes (LPNs) 830 and 832 via a backhaul communication link 842, such as X2 signaling via a wired connection or an optical fiber connection. The CPM can generate a downlink signal for a downlink node 814. The CPM can estimate a channel impulse response 890 for a channel between the downlink node and an uplink node 830 using the downlink signal or downlink signal information. The CPM can determine an inter-node interference signal for the channel using the downlink signal and the channel impulse response. The downlink signal 874 can be transmitted via the downlink node. The CPM can receive an uplink signal 864 from a wireless device via the uplink node at a substantially same time as the downlink signal is transmitted. The received inter-node interference signal can be subtracted from the uplink signal to form an inter-node interference compensated uplink signal to substantially cancel the inter-node interference from the downlink node in the uplink signal.

Inter-node interference cancellation can be provided for the uplink node 830 or 832 operating in an UL in proximity to downlink node 814 operating in a DL. The uplink signal received 864 by the uplink node 830 can be represented by $$y_{RRH_1}(t) = h_{RRH_1\text{-}UE_1} \otimes s_{U_1}(t) + h_{RRH_1\text{-}eNB} \otimes s_D(t) + n(t),$$

where $s_{U_1}(t)$ 876 is an uplink signal transmitted by a wireless device 854 to the uplink node, $s_D(t)$ 874 is a downlink signal transmitted by the downlink node 214 to a second wireless device 856, n(t) is additive noise from other sources, $h_{RRH_1\text{-}UE_1}$ 892 is a channel impulse response between the wireless device and the uplink node, $h_{RRH_1\text{-}eNB}$ 890 is a channel impulse response between the downlink node and the uplink node.

FIG. 8 also illustrates a second uplink signal received $y_{RRH_2}(t)$ 866 by a second uplink node 832, where $s_{U_2}(t)$ 878 is an second uplink signal transmitted by a third wireless device 858 to the second uplink node, $h_{RRH_2\text{-}UE_2}$ 896 is a channel impulse response between the third wireless device and the second uplink node, and $h_{RRH_2\text{-}eNB}$ 894 is a channel impulse response between the downlink node and the second uplink node. FIG. 8 also illustrates a downlink signal received by the second wireless device, including the downlink signal with the channel impulse response $h_{UE_3\text{-}eNB}$ 898 between the second wireless device and the downlink node.

Inter-node interference cancellation can be used in combination with MIMO beamforming techniques. For example, the transmit beamforming at the aggressor node or downlink node can provide null steering in the direction of the victim node or uplink node to minimize the signal transmission power emitted in the direction of the victim node or uplink node. Receiver (RX) beamforming and interference cancellation at the side of the victim node or uplink node can provide preliminary inter-cell interference compensation caused by the aggressor node or downlink node.

In another example, inter-cell interference cancellation can be applied to asynchronous DL and UL transmissions in different cells by using a reference interference signal waveform exchanged through the backhauling link between neighboring nodes. Inter-cell interference cancellation can include reconstruction of the DL signal waveforms from aggressor cells and/or adaptation to DL and UL traffic asymmetry in TDD networks.

In another configuration, explicit and implicit signaling can support adaptive UL-DL configurations in TDD-LTE systems. The signaling design to indicate the reconfiguration of the UL-DL configuration can depend on the frequency of reconfiguration to adapt to traffic conditions. As stated previously, the UL-DL configuration for legacy UEs can be changed semi-statically through SIB1 information bits. Re-configuration to adapt to traffic conditions, if done semi-statically, may also be supported via explicit signaling of the UL-DL configuration (including the flexible subframe) via a radio resource control (RRC) layer or by a media access control-control element (MAC-CE).

If adaptation is performed dynamically, the PDCCH or the enhanced physical downlink control channel (ePDCCH) carrying the relevant (UL/DL) DCI may be used to explicitly inform the advanced UEs of the UL-DL configuration in a dynamic way. For a dynamic signaling approach, either a specific DCI format (of the same size as DCI format 1C in LTE) may be designed that can also support UL-DL subframe configuration adaptation for multiple component carriers (CCs), or the configuration indication field (CIF) may be added to the existing backward compatible DCI formats. In an example, the specific DCI format to support UL-DL subframe configuration adaptation for multiple CCs can include multiple CIFs and/or use a configuration indicator-radio network temporary identifier (CI-RNTI). While fast adaptations (on scale of few milliseconds) may be beneficial in terms of matching the traffic conditions in respective cells, fast adaptations can lead to excessive signaling overhead if explicit signaling of the UL-DL subframe configuration is used.

Implicit signaling based on a subframe-pairing technique may also be used to dynamically indicate UL-DL configurations. Implicit signaling can rely on existing timing relationships for UL grants, PDSCH hybrid automatic repeat request-acknowledgement (HARQ-ACK) timing, and PHICH timing in legacy networks without explicit signaling. During implicit signaling the node may not explicitly signal or inform the UE of the FlexSF transmission direction (e.g., UL or DL). For implicit signaling, the wireless device (e.g., UE) can consider a FlexSF as a DL subframe in the absence of an UL grant in the DCI carried by the PDCCH on a relevant DL subframe (based on the UL grant timing). For an uplink subframe, the wireless device can use a pattern B MBSFN-type subframe (i.e., false MBSFN subframe) with a PDCCH, as shown in FIG. 3. Thus, implicit signaling can enable dynamic signaling of the UL-DL subframe configuration without increasing the signaling overhead. The MBSFN-type subframe design shown in FIG. 3 can enable an implicit signaling scheme. Implicit can be used to reduce signaling bandwidth and/or provide energy or power savings.

Automatic Repeat reQuest is a feedback mechanism whereby a receiving terminal requests retransmission of packets which are detected to be erroneous. Hybrid ARQ is a simultaneous combination of Automatic Retransmission reQuest (ARQ) and forward error correction (FEC) which can enables the overhead of error correction to be adapted dynamically depending on the channel quality. When HARQ is used and if the errors can be corrected by FEC then no retransmission may be requested, otherwise if the errors can be detected but not corrected, a retransmission can be requested. An ACKnowledgment (ACK) signal can be transmitted to indicate that one or more blocks of data, such as in a PDSCH, have been successfully received and decoded. HARQ-ACK/Negative ACKnowledgement (NACK or NAK) information can include feedback from a receiver to the transmitter in order to acknowledge a correct reception of a packet or ask for a new retransmission (via NACK or NAK).

The node can be responsible for proper scheduling of data transmission for legacy UEs to ensure that a corresponding PUSCH resources and HARQ-ACK resources of PDSCH and PUSCH are still valid even when the TDD configuration is changed for advanced UEs. In an example, the FlexSFs with dynamically configured transmission directions can also be utilized by advanced UEs while maintaining a proper HARQ-ACK feedback with predefined HARQ timeline linked and/or corresponding to a configured UL-DL configuration.

Some discrepancies related to sounding reference signals (SRS) resources may exist, especially SRS transmissions based on LTE trigger type 0 (i.e., via higher layer signaling, such as RRC signaling), for the case of dynamic adaptation. For example, the subframe used to transmit SRS, such as determined by the UE using subframe index $k_{SRS}$ within the frame and SRS subframe offset $T_{offset}$ values in LTE (3GPP Technical Specification [TS] 36.213 subsection 8.2 V11.0.0 [2012-09] and subsequent releases), can be configured in a semi-static manner. For instance, if such a subframe is a FlexSF, the FlexSF may not be changed into a DL subframe to avoid such events as a missed SRS transmission. Sounding reference signals can include reference signals transmitted in an uplink (UL) to enable the node to perform channel sounding, which can be used to support frequency-domain scheduling.

The various processes, methods, configurations, and systems described above can be combined in a TDD system operation (e.g., TD-LTE system operation) with adaptive UL-DL configurations. For example, a method of a TDD operation with adaptive UL-DL TDD configuration can start from an initial UL-DL default configuration for the cells. The UL-DL TDD configuration can be conveyed to the UEs in the respective cells via SIB1 messaging. The nodes (e.g., eNBs) can measure the local traffic condition, interference conditions, and evaluate the IM clustering conditions and/or partitions in order to improve and/or optimize a target performance metric(s), such as system throughput or spectral efficiency (SE). The node can coordinate through a backhaul link (e.g., X2 interface and/or point-to-point fiber connection) and determine to change a configuration for some cells or IM clusters. The node can send any reconfiguration information to a target cell or target cell clusters. The target cell or target cell clusters can use a flexible frame structure to change the target cell's or target cell clusters' UL-DL TDD configuration. Any reconfiguration information can be conveyed to the UEs either explicitly (via RRC signaling, a MAC-CE, and/or the PDCCH or ePDCCH) or implicitly utilizing UL grant timing. The node can coordinate the UL-DL configuration and scheduling of data as well as SRS transmissions considering backward compatibility and co-existence with legacy UEs, different RATs, transmission techniques, and/or node transmission powers. The nodes can also coordinate to employ CoMP or eICIC techniques to efficiently mitigate inter-cell interference. The nodes can monitor the traffic, interference conditions, and re-evaluate IM clustering conditions and/or partitions in order to optimize the target performance metric(s). If certain traffic, interference, and/or IM clustering conditions exist, the node can again coordinate through a backhaul link and determine to change a configuration for some cells or IM clusters, and the process can repeat again.

The method and/or system can include a general TDD system design framework (e.g., TD-LTE design framework) to provide efficient operation for advanced systems (e.g., 3GPP LTE V11.0.0 or LTE version 11 and subsequent releases) with efficient support for adaptive UL-DL subframe configurations based on a preferred performance metric or criteria (e.g., traffic conditions or overall system throughput) in different cells. The method and/or system can provide a scheme to improve and/or optimize the target performance metrics (e.g., system throughput or SE) by nodes (e.g., eNBs) utilizing the information including (but not limited to) local traffic condition, interference conditions, and/or possible IM clustering conditions and/or partitions to perform the adaptive UL-DL subframe reconfiguration. The method and/or system can take into account considerations on backward compatibility and handling of new interference types. In an example, the method and/or system can provide a complete design for effective support of adaptive UL-DL subframe configurations. For example, the system can include at least three major functional components: a frame structure using a flexible subframe structure, interference management (IM) schemes for TDD systems, and signaling support including explicit and implicit signaling. Various detailed design options can be available for functional component can be extended, modified or enhanced within the complete design framework. The TDD design framework can utilize different reconfigurable TDD frame structures, interference management (IM) schemes, and/or different control signaling designs to improve and/or optimize system performance. The TDD design framework can use a node to coordinate the UL-DL configuration and schedule data as well as SRS transmissions considering backward compatibility and co-existence aspects, such as legacy UEs, different RATs, transmission techniques, and/or node transmission powers. The TDD design framework can use a node to coordinate and employ CoMP or eICIC techniques to efficiently mitigate inter-cell interference.

In another example, a method of a TDD operation with adaptive UL-DL TDD configuration can start from an initial UL-DL default configuration for the cells in the network or system. The UL-DL TDD configuration can be conveyed to the UEs in the respective cells via SIB1 messaging. The nodes (e.g., eNBs) can measure the local traffic condition, interference conditions, and evaluate the IM clustering conditions and/or partitions in order to improve and/or optimize a target performance metric(s), such as system throughput or spectral efficiency (SE). The network can be divided into groups of neighboring nodes. Such grouping can be determined based on backhaul capabilities and connections between nodes. In each such group, based on a pre-defined periodicity and/or configuration, a particular set of cells can perform measurements on certain subframes, such as UL subframes. The UL transmissions, which may be transmitted during the TDD special subframes, from the UEs may not be scheduled to obtain long-term channel strength (e.g., RSRP-type information) from another set of neighboring cells to evaluate the IM clustering conditions. A second set of cells can operate in the DL mode, and measurements can be performed on the CRS or CSI-RS transmitted from the aggressor nodes.

Exchange of local traffic loading conditions in each cell can be facilitated by information exchange over the backhaul interface, where the concerned cells may report such information, including any relevant RSRP-type information, to a centralized processing unit (CPU) or CPM. The exchange of local traffic loading conditions can include both DL and UL traffic information, which information can implicitly indicate a preferred DL-UL subframe configuration in each cell. A master node, CPM, or CPU can coordinate through backhaul link (e.g., X2 interface and/or point-to-point fiber connection) and determine to change a configuration for some cells or IM clusters. The master node, CPM, or CPU can send any reconfiguration information to the target cell or cell clusters over the backhaul link. Coordination can also be realized in a distributed way between participating cells and nodes.

Target cell or target cell clusters can use a flexible frame structure to change the target cell's or target cell clusters' UL-DL TDD configuration. In an example, only an uplink subframe can change to DL mode based on the FlexSF frame structure illustrated in FIG. 2.

Any reconfiguration information can conveyed to an advanced UE (e.g., a UE using the LTE release 12 standard or subsequent release) using explicit layer 1 (i.e., physical or PHY layer) signaling. The information can be conveyed to the UEs via a configuration indication field (CIF) added to the existing legacy (e.g., LTE release 10 and/or 11) DCI formats.

Legacy UEs can operate according to the TDD configuration indicated through the SIB1 message as initially configured. The node can coordinate the UL-DL configuration and scheduling of data as well as SRS transmissions considering backward compatibility and co-existence with legacy UEs, different RATs, transmission-reception techniques, and/or node transmission powers. For IM clusters with cells operating in the DL mode, DL coordinated multi-point (CoMP) techniques can be used to improve the DL spectral efficiency (SE) within the cluster. The node can monitor the traffic, interference conditions, and re-evaluate possible IM clustering conditions and/or partitions in order to optimize the target performance metric(s), which can facilitated by RSRP-type measurement information, as previously described. If conditions for a re-configuration of the IM clusters are met, the master node, CPM, or CPU can again coordinate through a backhaul link and determine to change a configuration for some cells or IM clusters, and the process can repeat again.

Figure 10:
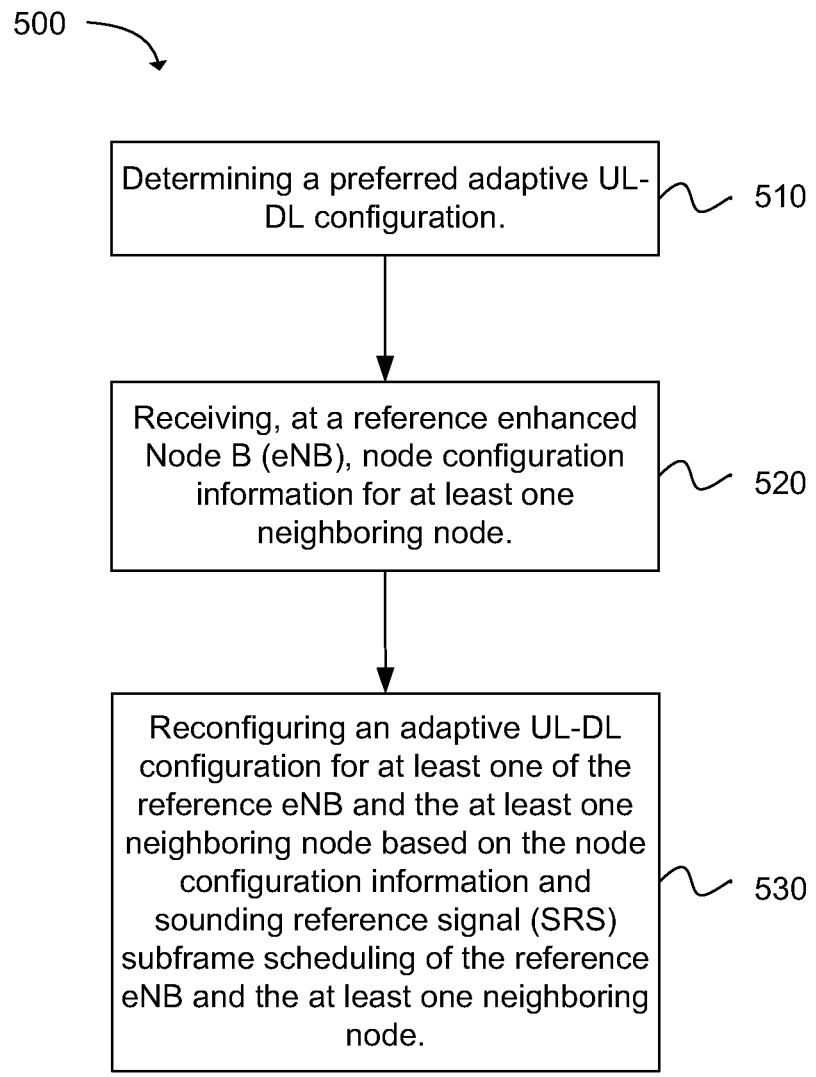
FIG. 10 depicts a flow chart of a method for adapting uplink-downlink (UL-DL) time-division duplexing (TDD) subframe configurations in a heterogeneous network (HetNet) in accordance with an example.

Another example provides a method 500 for adapting uplink-downlink (UL-DL) time-division duplexing (TDD) subframe configurations in a heterogeneous network (Het-Net), as shown in the flow chart in FIG. 10. The method may be executed as instructions on a machine or computer circuitry, where the instructions are included on at least one computer readable medium or one non-transitory machine readable storage medium. The method includes the operation of determining a preferred adaptive UL-DL configuration, as in block 510. The operation of receiving, at a reference enhanced Node B (eNB), node configuration information for at least one neighboring node follows, as in block 520. The next operation of the method can be reconfiguring an adaptive UL-DL configuration for at least one of the reference eNB and the at least one neighboring node based on the node configuration information and sounding reference signal (SRS) subframe scheduling of the reference eNB and the at least one neighboring node, as in block 530.

The node configuration information can include an UL-DL configuration, a radio access technology (RAT) standard, or a node's nominal transmission power. In an example, the reference eNB can be in a different cell from the at least one neighboring node. In another example, the reference eNB and the at least one neighboring node can share a common cell identifier (ID).

Receiving and transmitting node configuration information and other information between the reference eNB and the at least one neighboring node can use a backhaul link via a wired connection, a wireless connection, or an optical fiber connection. In an example, the method can further include sending, from the reference eNB, the adaptive UL-DL reconfiguration to the at least one neighboring node; and scheduling UL data, DL data, and SRS transmissions at the reference eNB based on the adaptive UL-DL reconfiguration. The UL data, DL data, and SRS transmissions can also be scheduled at the at least one neighboring node based on the adaptive UL-DL reconfiguration.

In a configuration, the operation of determining the preferred adaptive UL-DL configuration can further include: Determining a criteria for optimizing at least one system performance metric based on at least one system operation metric; measuring the at least one system operation metric at the reference eNB; receiving, at the reference eNB, at least one system operation metric measurement from the at least one neighboring node; and configuring the preferred adaptive UL-DL configuration based on the at least one system operation metric measurement to improve the at least one system performance metric. The system performance metric can include a system throughput, spectral efficiency (SE), a delay metric, a quality of service (QoS) metric, or a quality of experience (QoE) metric. The system operation metric can include a traffic condition, traffic loading, an interference type, or an interference condition.

In another configuration, the operation of determining the preferred adaptive UL-DL configuration can further include: Measuring interference on an uplink (UL) subframe of the reference eNB during a downlink (DL) subframe of the at least one neighboring node; receiving, at the reference eNB, an interference measurement from at least one neighboring node, wherein the interference measurement includes a reference signal received power (RSRP) or reference signal received quality (RSRQ) measurement on a UL channel of the reference eNB; determining interference management (IM) clusters based on the collected interference measurements due to neighboring nodes; and configuring the preferred adaptive UL-DL configuration for each IM cluster. The nodes generating interference to each other above a specified threshold can be grouped together in a same IM cluster.

In an example, the method can further include configuring the nodes in each IM cluster operating in downlink (DL) mode with a transmission technique based on loading and interference conditions to improve spectral efficiency or mitigate inter-cell interference within the IM cluster. The transmission technique can include a downlink (DL) coordinated multi-point (CoMP) transmission, enhanced inter-cell interference coordination (eICIC), and combinations thereof.

In another example, the operation of determining IM clusters can further include: Estimating a pathloss of node-to-node channels between the nodes having a same cell identity or different cell identities using a cell-specific reference signal (CRS) or a channel-state information reference signal (CSI-RS); and comparing the estimated pathloss to the specified threshold.

In another configuration, the operation of reconfiguring the adaptive UL-DL configuration can further include: Determining uplink (UL) subframes used to transmit sounding reference signals (SRS); and changing a flexible subframe (FlexSF) of the adaptive UL-DL configuration used for an UL to a downlink (DL) when the FlexSF is not scheduled to transmit SRS.

In an example, operation of reconfiguring the adaptive UL-DL configuration can be configured semi-statically via system information block type1 (SIB1) information bits, radio resource control (RRC) signaling, or a medium access control (MAC) control element (MAC-CE). In another example, operation of reconfiguring the adaptive UL-DL configuration can be configured dynamically via explicitly using a physical downlink control channel (PDCCH) or an enhanced physical downlink control channel (ePDCCH) carrying a relevant downlink control information (DCI) or implicitly where a flexible subframe (FlexSF) of the adaptive UL-DL configuration operates as a downlink (DL) subframe when the relevant DCI does not include an uplink (UL) grant.

In another configuration, the operation of determining the preferred adaptive UL-DL configuration can further include: Measuring the reference eNB's traffic condition and interference condition; receiving, at the reference eNB, a traffic condition and an interference condition from a plurality of neighboring nodes; determining an interference management (IM) clustering condition and partition for the reference eNB and the plurality of neighboring nodes; grouping the reference eNB and the plurality of neighboring nodes based on the traffic condition, the interference condition, the IM clustering condition and partition, a backhaul capability, a UL-DL configuration periodicity, or a UL-DL configuration. The interference condition can include adjacent channel interference and co-channel interference. In another example, the method can further include monitoring the traffic condition, the interference condition, and IM clustering condition and partition of the reference eNB and the at least one neighboring node to improve a performance metric.

Figure 11:
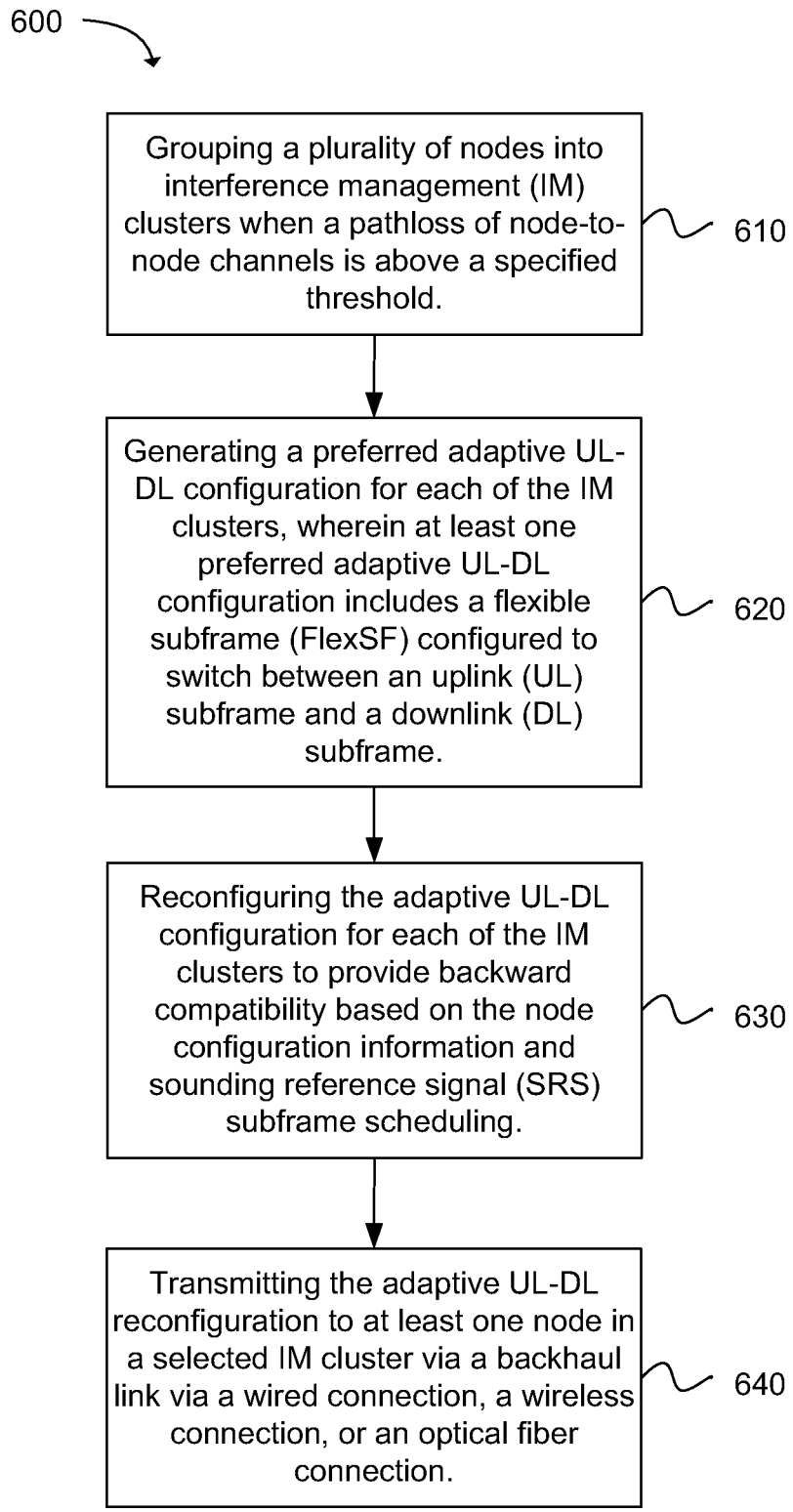
FIG. 11 depicts a flow chart of a method for adapting uplink-downlink (UL-DL) time-division duplexing (TDD) subframe configurations in a heterogeneous network (HetNet) in accordance with an example.

Another example provides a method 600 for adapting uplink-downlink (UL-DL) time-division duplexing (TDD) subframe configurations in a heterogeneous network (HetNet), as shown in the flow chart in FIG. 11. The method may be executed as instructions on a machine or computer circuitry, where the instructions are included on at least one computer readable medium or one non-transitory machine readable storage medium. The method includes the operation of grouping a plurality of nodes into interference management (IM) clusters when a pathloss of node-to-node channels is above a specified threshold, as in block 610. The operation of generating a preferred adaptive UL-DL configuration for each of the IM clusters, wherein at least one preferred adaptive UL-DL configuration includes a flexible subframe (FlexSF) configured to switch between an uplink (UL) subframe and a downlink (DL) subframe follows, as in block 620. The next operation of the method can be reconfiguring the adaptive UL-DL configuration for each of the IM clusters to provide backward compatibility based on the node configuration information and sounding reference signal (SRS) subframe scheduling, as in block 630. The method can further include transmitting the adaptive UL-DL reconfiguration to at least one node in a selected IM cluster via a backhaul link via a wired connection, a wireless connection, or an optical fiber connection, as in block 640.

In an example, the method can further include a node dynamically signaling a wireless device in the IM cluster with the adaptive UL-DL configuration explicitly using a physical downlink control channel (PDCCH) or an enhanced physical downlink control channel (ePDCCH) carrying a relevant downlink control information (DCI) or implicitly where the FlexSF operates as a downlink (DL) subframe when the relevant DCI does not include an uplink (UL) grant. The node configuration information can include an UL-DL configuration, a radio access technology (RAT) standard, or a node's nominal transmission power.

In a configuration, the operation of generating the preferred adaptive UL-DL configuration can further include: Determining a criteria for optimizing at least one system performance metric based on at least one system operation metric; measuring the at least one system operation metric at an eNB; collecting at least one system operation metric measurements from a plurality of nodes; and configuring the preferred adaptive UL-DL configuration based on the at least one system operation metric measurements to improve the at least one system performance metric. In an example, the at least one system performance metric can include a system throughput, spectral efficiency (SE), a delay metric, a quality of service (QoS) metric, or a quality of experience (QoE) metric. In another example, the at least one system operation metric can include a traffic condition, traffic loading, an interference type, or an interference condition.

In another configuration, the operation of generating the preferred adaptive UL-DL configuration can further include: Measuring a node's traffic condition, interference condition, or IM clustering condition and partition, wherein the interference condition includes adjacent channel interference and co-channel interference; collecting the traffic conditions, interference conditions, or IM clustering condition and partition from a plurality of nodes; regrouping the plurality of nodes based on the traffic condition, the interference condition, the IM clustering condition and partition, a backhaul capability, a UL-DL configuration periodicity, or a UL-DL configuration; configuring the nodes in each IM cluster operating in downlink (DL) mode with a transmission technique; and monitoring the traffic condition, the interference condition, or IM clustering condition and partition of the plurality of nodes to improve a performance metric. The transmission technique (or transmission-reception technique) can include a downlink (DL) coordinated multi-point (CoMP) transmission, enhanced inter-cell interference coordination (eICIC), and combinations thereof.

Figure 12:
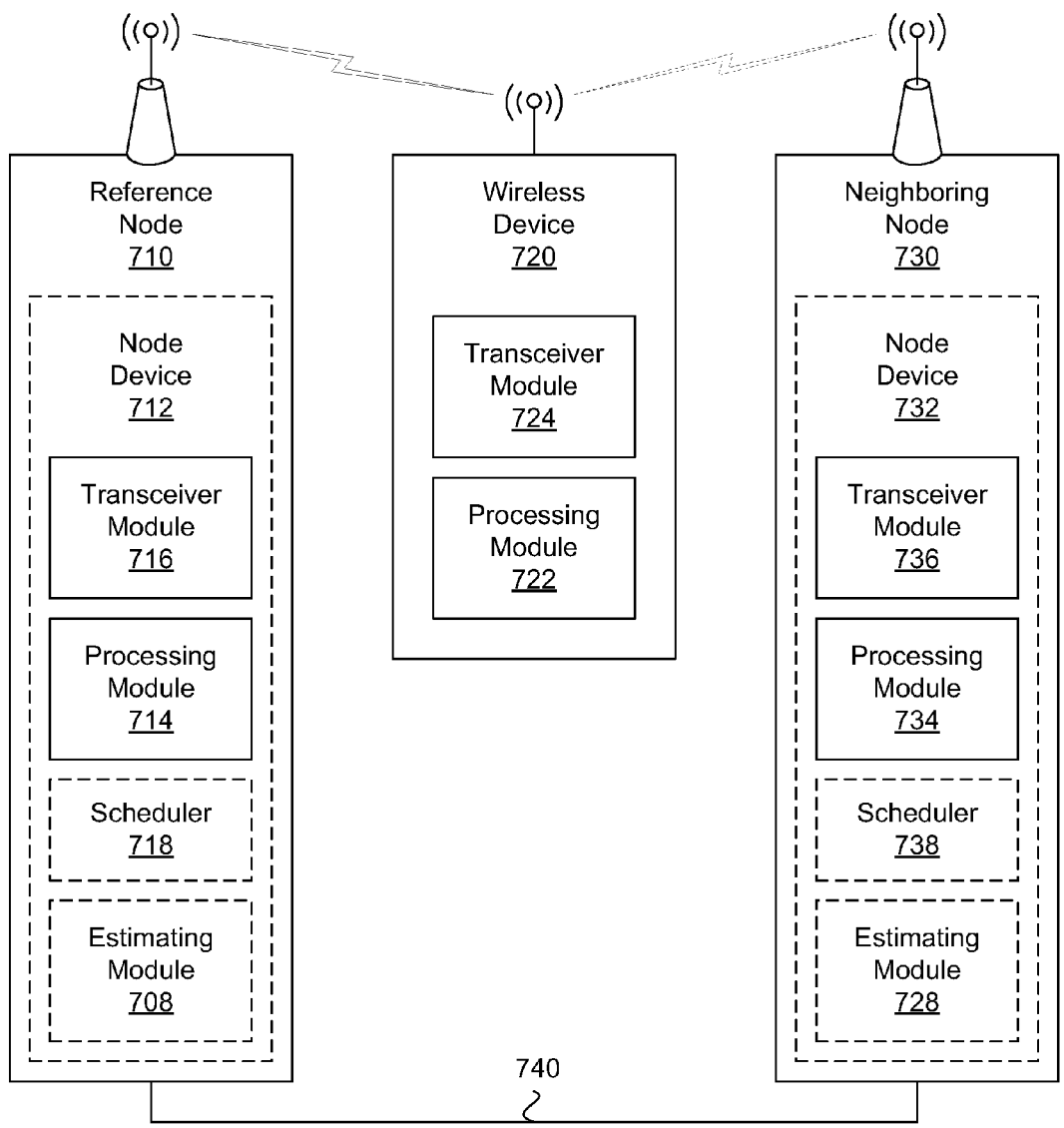
FIG. 12 illustrates a block diagram of a reference node, a neighboring node, and wireless device in accordance with an example.

FIG. 12 illustrates an example node (e.g., reference node 710 and neighboring node 730) and an example wireless device 720. The node can include a node device 712 and 732. The node device or the node can be configured to communicate with the wireless device. The node device can be configured to adapt uplink-downlink (UL-DL) time-division duplexing (TDD) subframe configurations in a heterogeneous network (HetNet). The node device or the node can be configured to communicate with other nodes via a backhaul link 740 (optical, wireless, or wired link), such as an X2 application protocol (X2AP). The node device can include a processing module 714 and 734, a transceiver module 716 and 736, a scheduler 718 and 738, and estimating module 708 and 728.

In an example, the functions of the scheduler and/or the estimating module can be performed by the processing module. The transceiver module can be configured to receive node configuration information for at least one neighboring node and transmit a UL-DL configuration to the at least one neighboring node. The transceiver module can be further configured to communicate with the neighboring node via X2 signaling, X2 application protocol (X2AP), or backhaul link signaling via a wired connection, a wireless connection, or an optical fiber connection. The processing module can be enabled to reconfigure an adaptive UL-DL configuration for at least one of a plurality of nodes including the at least one neighboring node based on the node configuration information. The plurality of nodes can use a common cell identity or distinct cell identities.

Reconfiguring the adaptive UL-DL configuration can include changing a flexible subframe (FlexSF) from an uplink (UL) to a downlink (DL). The node configuration information can include an UL-DL configuration, a radio access technology (RAT) standard, or a node's nominal transmission power. The node (e.g., reference node 710 and neighboring node 730) can include a base station (BS), a Node B (NB), an evolved Node B (eNB), a baseband unit (BBU), a remote radio head (RRH), a remote radio equipment (RRE), a remote radio unit (RRU), or a central processing module (CPM).

In a configuration, the processing module 714 and 734 can be further operable to reconfigure the FlexSF of the adaptive UL-DL configuration from a UL subframe to a DL subframe when the FlexSF is not scheduled to transmit a sounding reference signal (SRS). In another configuration, the scheduler 718 and 738 can be configured to schedule UL data, DL data, and sounding reference signal (SRS) transmissions based on the adaptive UL-DL reconfiguration.

In another configuration, the processing module 714 and 734 can be further operable to determine at least one system operation metric to monitor, measure the at least one system operation metric, and configure an adaptive UL-DL configuration to improve a system performance metric based on at least one system operation metric measurement from a plurality of eNBs. The system performance metric can include a system throughput, spectral efficiency (SE), a delay metric, a quality of service (QoS) metric, or a quality of experience (QoE) metric. The at least one system operation metric can include a traffic condition, traffic loading, an interference type, and an interference condition. The transceiver module 716 and 736 can be further operable to receive the at least one system operation metric measurement from the at least one neighboring node.

In another configuration, the estimating module 708 and 728 can be configured to estimate a pathloss of node-to-node channels between nodes having a common cell identity or distinct cell identities using a cell-specific reference signal (CRS) or a channel-state information reference signal (CSI-RS). The transceiver module 716 and 736 can be further operable to receive an interference measurement from at least one neighboring node. The interference measurement can include a reference signal received power (RSRP) or reference signal received quality (RSRQ) measurement on a UL channel of the at least one neighboring node generating the interference measurement. The processing module 714 and 734 can be further operable to measure interference on a UL subframe of the node during a DL subframe of the at least one neighboring node, compare the estimated pathloss of the node-to-node channels for each pair of the nodes to a specified threshold, group the nodes together in a same interference management (IM) cluster when the estimated pathloss associated with the nodes exceeds the specified threshold, and configure the adaptive UL-DL configuration for each IM cluster.

In an example, the processing module 714 and 734 can be further operable to configure the nodes in each IM cluster operating in downlink (DL) mode with a transmission technique to improve spectral efficiency or mitigate inter-cell interference within the IM cluster. The transmission technique can include a downlink (DL) coordinated multi-point (CoMP) transmission, enhanced inter-cell interference coordination (eICIC), and combinations thereof.

In another example, the transceiver module 716 and 736 can be further operable to receive downlink signal information from a neighboring node. The processing module 714 and 734 can be further operable to estimate a channel impulse response for a channel between the neighboring node and the node using the downlink signal information, estimate an inter-node interference signal for the channel using the downlink signal information and the channel impulse response, and subtract the estimated inter-node interference signal from a received signal to substantially cancel the inter-node interference from the neighboring node before decoding a desired uplink signal. The transceiver module can be further configured to receive the uplink signal from a wireless device before subtracting the estimated inter-node interference signal from the uplink signal, and the downlink signal information can be received prior to the reception of the uplink signal.

In another configuration, the processing module 714 and 734 can be further operable to reconfigure the adaptive UL-DL configuration dynamically via explicitly using a physical downlink control channel (PDCCH) or an enhanced physical downlink control channel (ePDCCH) carrying a relevant downlink control information (DCI) or implicitly where the FlexSF operates as a downlink (DL) subframe when the relevant DCI does not include an uplink (UL) grant.

The wireless device 720 can include a transceiver module 724 and a processing module 722. The processing module can be configured to generate a SRS and an uplink signal and process a downlink signal. The transceiver module can be configured to transmit the SRS and the uplink signal and receive the downlink signal.

Figure 13:
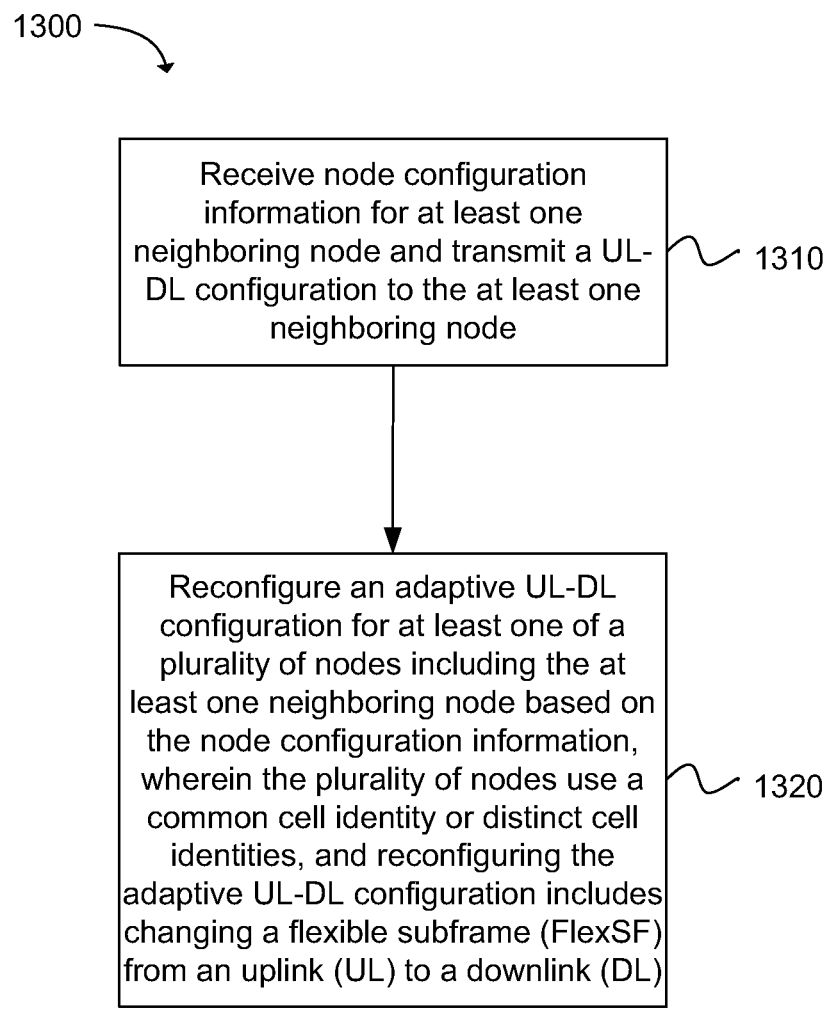
FIG. 13 depicts functionality of a node device operable to adapt uplink-downlink (UL-DL) time-division duplexing (TDD) subframe configurations in a heterogeneous network (HetNet)

Another example provides functionality 1300 of a node device operable to adapt uplink-downlink (UL-DL) time-division duplexing (TDD) subframe configurations in a heterogeneous network (HetNet), as shown in the flow chart in FIG. 13. The functionality can be implemented as a method or the functionality can be executed as instructions on a machine, where the instructions are included on at least one computer readable medium or one non-transitory machine readable storage medium. The node device can be configured to receive node configuration information for at least one neighboring node and transmit a UL-DL configuration to the at least one neighboring node, as in block 1310. In addition, the node device can be configured to reconfigure an adaptive UL-DL configuration for at least one of a plurality of nodes including the at least one neighboring node based on the node configuration information, wherein the plurality of nodes use a common cell identity or distinct cell identities, and reconfiguring the adaptive UL-DL configuration includes changing a flexible subframe (FlexSF) from an uplink (UL) to a downlink (DL), as in block 1320.

Figure 14:
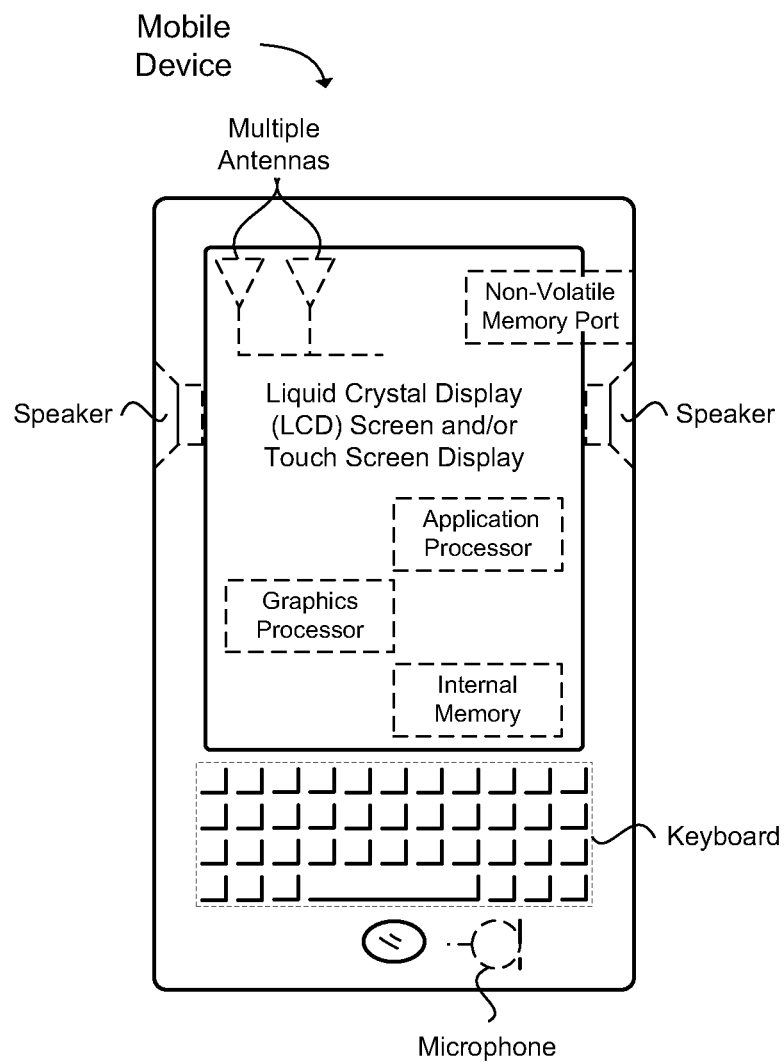
FIG. 14 illustrates a diagram of a wireless device (e.g., UE) in accordance with an example.

FIG. 14 provides an example illustration of the wireless device, such as an user equipment (UE), a mobile station (MS), a mobile wireless device, a mobile communication device, a tablet, a handset, or other type of wireless device. The wireless device can include one or more antennas configured to communicate with a node, macro node, low power node (LPN), or transmission station, such as a base station (BS), an evolved Node B (eNB), a baseband unit (BBU), a remote radio head (RRH), a remote radio equipment (RRE), a relay station (RS), a radio equipment (RE), or other type of wireless wide area network (WWAN) access point. The wireless device can be configured to communicate using at least one wireless communication standard including 3GPP LTE, WiMAX, High Speed Packet Access (HSPA), Bluetooth, and WiFi. The wireless device can communicate using separate antennas for each wireless communication standard or shared antennas for multiple wireless communication standards. The wireless device can communicate in a wireless local area network (WLAN), a wireless personal area network (WPAN), and/or a WWAN.

FIG. 14 also provides an illustration of a microphone and one or more speakers that can be used for audio input and output from the wireless device. The display screen may be a liquid crystal display (LCD) screen, or other type of display screen such as an organic light emitting diode (OLED) display. The display screen can be configured as a touch screen. The touch screen may use capacitive, resistive, or another type of touch screen technology. An application processor and a graphics processor can be coupled to internal memory to provide processing and display capabilities. A non-volatile memory port can also be used to provide data input/output options to a user. The non-volatile memory port may also be used to expand the memory capabilities of the wireless device. A keyboard may be integrated with the wireless device or wirelessly connected to the wireless device to provide additional user input. A virtual keyboard may also be provided using the touch screen.

Various techniques, or certain aspects or portions thereof, may take the form of program code (i.e., instructions) embodied in tangible media, such as floppy diskettes, CD-ROMs, hard drives, non-transitory computer readable storage medium, or any other machine-readable storage medium wherein, when the program code is loaded into and executed by a machine, such as a computer, the machine becomes an apparatus for practicing the various techniques. Circuitry can include hardware, firmware, program code, executable code, computer instructions, and/or software. A non-transitory computer readable storage medium can be a computer readable storage medium that does not include signal. In the case of program code execution on programmable computers, the computing device may include a processor, a storage medium readable by the processor (including volatile and non-volatile memory and/or storage elements), at least one input device, and at least one output device. The volatile and non-volatile memory and/or storage elements may be a RAM, EPROM, flash drive, optical drive, magnetic hard drive, solid state drive, or other medium for storing electronic data. The node and wireless device may also include a transceiver module, a counter module, a processing module, and/or a clock module or timer module. One or more programs that may implement or utilize the various techniques described herein may use an application programming interface (API), reusable controls, and the like. Such programs may be implemented in a high level procedural or object oriented programming language to communicate with a computer system. However, the program(s) may be implemented in assembly or machine language, if desired. In any case, the language may be a compiled or interpreted language, and combined with hardware implementations.

It should be understood that many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions, which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. The modules may be passive or active, including agents operable to perform desired functions.

Reference throughout this specification to "an example" means that a particular feature, structure, or characteristic described in connection with the example is included in at least one embodiment of the present invention. Thus, appearances of the phrases "in an example" in various places throughout this specification are not necessarily all referring to the same embodiment.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and example of the present invention may be referred to herein along with alternatives for the various components thereof. It is understood that such embodiments, examples, and alternatives are not to be construed as defacto equivalents of one another, but are to be considered as separate and autonomous representations of the present invention.

Furthermore, the described features, structures, or characteristics may be combined in any suitable manner in one or more embodiments. In the preceding descriptions, numerous specific details are provided, such as examples of layouts, distances, network examples, etc., to provide a thorough understanding of embodiments of the invention. One skilled in the relevant art will recognize, however, that the invention can be practiced without one or more of the specific details, or with other methods, components, layouts, etc. In other instances, well-known structures, materials, or operations are not shown or described in detail to avoid obscuring aspects of the invention.

While the forgoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

What is claimed is:

1. A method for adapting uplink-downlink (UL-DL) time-division duplexing (TDD) subframe configurations in a heterogeneous network (HetNet), said method comprising:
    calculating a preferred adaptive UL-DL configuration;
    receiving, at a reference enhanced Node B (eNB), node configuration information for at least one neighboring node;
    reconfiguring an adaptive UL-DL configuration for at least one of the reference eNB and the at least one neighboring node to correspond with the preferred adaptive UL-DL configuration, the adaptive UL-DL configuration being reconfigured based on the node configuration information and sounding reference signal (SRS) subframe scheduling of the reference eNB and the at least one neighboring node;
    sending, from the reference eNB, the adaptive UL-DL reconfiguration to the at least one neighboring node; and
    scheduling UL data, DL data, and SRS transmissions at the reference eNB based on the adaptive UL-DL reconfiguration.

2. The method of claim 1, wherein the node configuration information includes at least one of: an UL-DL configuration for the at least one neighboring node, a radio access technology (RAT) standard, or a node's nominal transmission power.

3. The method of claim 1, wherein receiving and transmitting node configuration information and other information between the reference eNB and the at least one neighboring node uses a backhaul link via a wired connection, a wireless connection, or an optical fiber connection.

4. The method of claim 1, wherein calculating the preferred adaptive UL-DL configuration further comprises:
    determining a criteria for optimizing at least one system performance metric based on at least one system operation metric;
    measuring the at least one system operation metric at the reference eNB;
    receiving, at the reference eNB, at least one system operation metric measurement from the at least one neighboring node; and
    configuring the preferred adaptive UL-DL configuration based on the at least one system operation metric measurement to improve the at least one system performance metric.

5. The method of claim 4, wherein
    the system performance metric is selected from the group consisting of a system throughput, spectral efficiency (SE), a delay metric, a quality of service (QoS) metric, a quality of experience (QoE) metric, and combinations thereof; and
    the system operation metric is selected from the group consisting of a traffic condition, traffic loading, an interference type, an interference condition, and combinations thereof.

6. The method of claim 1, wherein calculating the preferred adaptive UL-DL configuration further comprises:
    measuring interference on an uplink (UL) subframe of the reference eNB during a downlink (DL) subframe of the at least one neighboring node;
    receiving, at the reference eNB, an interference measurement from at least one neighboring node, wherein the interference measurement includes a reference signal received power (RSRP) or reference signal received quality (RSRQ) measurement on a UL channel of the reference eNB;
    determining interference management (IM) clusters based on the collected interference measurements due to neighboring nodes, wherein the nodes generating interference to each other above a specified threshold are grouped together in a same IM cluster; and
    configuring the preferred adaptive UL-DL configuration for each IM cluster.

7. The method of claim 6, further comprising:
    configuring the nodes in each IM cluster operating in downlink (DL) mode with a transmission technique based on loading and interference conditions to improve spectral efficiency or mitigate inter-cell interference within the IM cluster, wherein the transmission technique is selected from the group consisting of downlink (DL) coordinated multi-point (CoMP) transmission, enhanced inter-cell interference coordination (eICIC), and combinations thereof.

8. The method of claim 6, wherein determining IM clusters further comprises:
    estimating a pathloss of node-to-node channels between the nodes having a same cell identity or different cell identities using a cell-specific reference signal (CRS) or a channel-state information reference signal (CSI-RS); and
    comparing the estimated pathloss to the specified threshold.

9. The method of claim 1, wherein reconfiguring the adaptive UL-DL configuration further comprises:
    determining uplink (UL) subframes used to transmit sounding reference signals (SRS); and
    changing a flexible subframe (FlexSF) of the adaptive UL-DL configuration used for an UL to a downlink (DL) when the FlexSF is not scheduled to transmit SRS.

10. The method of claim 1, wherein reconfiguring the adaptive UL-DL configuration is configured semi-statically via system information block type1 (SIB1) information bits, radio resource control (RRC) signaling, or a medium access control (MAC) control element (MAC-CE); or reconfiguring the adaptive UL-DL configuration is configured dynamically via explicitly using a physical downlink control channel (PDCCH) or an enhanced physical downlink control channel (ePDCCH) carrying a relevant downlink control information (DCI) or implicitly where a flexible subframe (FlexSF) of the adaptive UL-DL configuration operates as a downlink (DL) subframe when the relevant DCI does not include an uplink (UL) grant.

11. The method of claim 1, wherein calculating the preferred adaptive UL-DL configuration further comprises:
    measuring the reference eNB's traffic condition and interference condition, wherein the interference condition includes adjacent channel interference and co-channel interference;
    receiving, at the reference eNB, a traffic condition and an interference condition from a plurality of neighboring nodes;

determining an interference management (IM) clustering condition and partition for the reference eNB and the plurality of neighboring nodes;

grouping the reference eNB and the plurality of neighboring nodes based on information selected from the group consisting of the traffic condition, the interference condition, the IM clustering condition and partition, a backhaul capability, a UL-DL configuration periodicity, a UL-DL configuration, and combinations thereof.

12. The method of claim 11, further comprising:
monitoring the traffic condition, the interference condition, and IM clustering condition and partition of the reference eNB and the at least one neighboring node to improve a performance metric.

13. At least one non-transitory computer readable medium storing a plurality of instructions which when executed by one or more processors perform the following:
calculating a preferred adaptive UL-DL configuration;
receiving, at a reference enhanced Node B (eNB), node configuration information for at least one neighboring node;
reconfiguring an adaptive UL-DL configuration for at least one of the reference eNB and the at least one neighboring node to correspond with the preferred adaptive UL-DL configuration, the adaptive UL-DL configuration being reconfigured based on the node configuration information and sounding reference signal (SRS) subframe scheduling of the reference eNB and the at least one neighboring node;
sending, from the reference eNB, the adaptive UL-DL reconfiguration to the at least one neighboring node; and
scheduling UL data, DL data, and SRS transmissions at the reference eNB based on the adaptive UL-DL reconfiguration.

14. A node device operable to adapt uplink-downlink (UL-DL) time-division duplexing (TDD) subframe configurations in a heterogeneous network (HetNet), the node device comprising:
a processing module to:
calculate a preferred adaptive UL-DL configuration; and
reconfigure an adaptive UL-DL configuration for at least one of a plurality of nodes including at least one neighboring node to correspond with the preferred adaptive UL-DL configuration, the adaptive UL-DL configuration being reconfigured based in part on node configuration information for the at least one neighboring node, wherein the plurality of nodes use a common cell identity or distinct cell identities, and reconfiguring the adaptive UL-DL configuration includes changing a flexible subframe (FlexSF) from an uplink (UL) to a downlink (DL), wherein the processing module is comprised of code that is located in one or more digital memory devices to be executed by one or more processors or the processing module is implemented in a first hardware circuit; and
a transceiver module to transmit, using an antenna, the adaptive UL-DL configuration to the at least one neighboring node, wherein the transceiver module is comprised of code that is located in the one or more digital memory devices to be executed by the one or more processors or the transceiver module is implemented in a second hardware circuit.

15. The node device of claim 14, wherein the processing module is further operable to reconfigure the FlexSF of the adaptive UL-DL configuration from a UL subframe to a DL subframe when the FlexSF is not scheduled to transmit a sounding reference signal (SRS).

16. The node device of claim 14, wherein the transceiver module is further configured to communicate with neighboring nodes via X2 signaling or backhaul link signaling via a wired connection, a wireless connection, or an optical fiber connection; and the node configuration information includes at least one of: an UL-DL configuration, a radio access technology (RAT) standard, or a node's nominal transmission power.

17. The node device of claim 14, further comprising:
a scheduling module configured to schedule UL data, DL data, and sounding reference signal (SRS) transmissions based on the adaptive UL-DL reconfiguration, wherein the scheduling module is comprised of code that is located in the one or more digital memory devices to be executed by the one or more processors or the scheduling module is implemented in a third hardware circuit.

18. The node device of claim 14, wherein:
the processing module is further operable to determine at least one system operation metric to monitor, measure the at least one system operation metric, and configure an adaptive UL-DL configuration to improve a system performance metric based on at least one system operation metric measurement from a plurality of eNBs, wherein the system performance metric is selected from the group consisting of a system throughput, spectral efficiency (SE), a delay metric, a quality of service (QoS) metric, a quality of experience (QoE) metric, and combinations thereof; and the at least one system operation metric is selected from the group consisting of a traffic condition, traffic loading, an interference type, an interference condition, and combinations thereof; and
the transceiver module is further operable to receive the at least one system operation metric measurement from the at least one neighboring node.

19. The node device of claim 14, further comprising:
an estimating module to estimate a pathloss of node-to-node channels between nodes having a common cell identity or distinct cell identities using a cell-specific reference signal (CRS) or a channel-state information reference signal (CSI-RS), wherein the estimating module is comprised of code that is located in the one or more digital memory devices to be executed by the one or more processors or the estimating module is implemented in a third hardware circuit; wherein
the transceiver module is further operable to receive an interference measurement from at least one neighboring node, wherein the interference measurement includes a reference signal received power (RSRP) or reference signal received quality (RSRQ) measurement on a UL channel of the at least one neighboring node generating the interference measurement; and
the processing module is further operable to measure interference on a UL subframe of the node during a DL subframe of the at least one neighboring node, compare the estimated pathloss of the node-to-node channels for each pair of the nodes to a specified threshold, group the nodes together in a same interference management (IM) cluster when the estimated pathloss associated with the nodes exceeds the specified threshold, and configure the adaptive UL-DL configuration for each IM cluster.

20. The node device of claim 19, wherein the processing module is further operable to configure the nodes in each IM cluster operating in downlink (DL) mode with a transmission technique to improve spectral efficiency or mitigate inter-cell interference within the IM cluster, wherein the transmission-reception technique is selected from the group consisting of downlink (DL) coordinated multi-point (CoMP) transmission, enhanced inter-cell interference coordination (eICIC), and combinations thereof.

21. The node device of claim 19, wherein:
the transceiver module is further operable to receive downlink signal information from a neighboring node; and
the processing module is further operable to estimate a channel impulse response for a channel between the neighboring node and the node using the downlink signal information, estimate an inter-node interference signal for the channel using the downlink signal information and the channel impulse response, and subtract the estimated inter-node interference signal from a received signal to substantially cancel the inter-node interference from the neighboring node before decoding a desired uplink signal,
wherein the transceiver module is further configured to receive the uplink signal from a wireless device before subtracting the estimated inter-node interference signal from the uplink signal, and the downlink signal information is received prior to the reception of the uplink signal.

22. The node device of claim 14, wherein the processing module is further operable to reconfigure the adaptive UL-DL configuration dynamically via explicitly using a physical downlink control channel (PDCCH) or an enhanced physical downlink control channel (ePDCCH) carrying a relevant downlink control information (DCI) or implicitly where the FlexSF operates as a downlink (DL) subframe when the relevant DCI does not include an uplink (UL) grant.

23. At least one non-transitory machine readable storage medium which stores a plurality of instructions which when executed by a processor perform the following:
assigning a plurality of nodes into interference management (IM) clusters when a pathloss of node-to-node channels is above a specified threshold;
generating a preferred adaptive uplink-downlink (UL-DL) configuration for each of the IM clusters, wherein at least one preferred adaptive UL-DL configuration includes a flexible subframe (FlexSF) configured to switch between an uplink (UL) subframe and a downlink (DL) subframe;
reconfiguring the adaptive UL-DL configuration for each of the IM clusters to provide backward compatibility based on the node configuration information and sounding reference signal (SRS) subframe scheduling; and
transmitting the adaptive UL-DL reconfiguration to at least one node in a selected IM cluster via a backhaul link via a wired connection, a wireless connection, or an optical fiber connection.

24. The at least one non-transitory machine readable storage medium of claim 23, further comprising instructions which when executed by the processor perform the following:
dynamically signaling a wireless device in the IM cluster with the adaptive UL-DL configuration explicitly using a physical downlink control channel (PDCCH) or an enhanced physical downlink control channel (ePDCCH) carrying a relevant downlink control information (DCI) or implicitly where the FlexSF operates as a downlink (DL) subframe when the relevant DCI does not include an uplink (UL) grant.

25. The at least one non-transitory machine readable storage medium of claim 23, wherein the node configuration information includes at least one of: an UL-DL configuration, a radio access technology (RAT) standard, or a node's nominal transmission power.

26. The at least one non-transitory machine readable storage medium of claim 23, wherein generating the preferred adaptive UL-DL configuration further comprises instructions which when executed by the processor perform the following:
determining a criteria for optimizing at least one system performance metric based on at least one system operation metric, wherein the at least one system performance metric is selected from the group consisting of a system throughput, spectral efficiency (SE), a delay metric, a quality of service (QoS) metric, a quality of experience (QoE) metric, and combinations thereof; and the at least one system operation metric is selected from the group consisting of a traffic condition, traffic loading, an interference type, an interference condition, and combinations thereof;
measuring the at least one system operation metric at an eNB;
collecting at least one system operation metric measurements from a plurality of nodes; and
configuring the preferred adaptive UL-DL configuration based on the at least one system operation metric measurements to improve the at least one system performance metric.

27. The at least one non-transitory machine readable storage medium of claim 23, wherein generating the preferred adaptive UL-DL configuration further comprises instructions which when executed by the processor perform the following:
measuring a node's traffic condition, interference condition, or IM clustering condition and partition, wherein the interference condition includes adjacent channel interference and co-channel interference;
collecting the traffic conditions, interference conditions, or IM clustering condition and partition from a plurality of nodes;
regrouping the plurality of nodes based on information selected from the group consisting of the traffic condition, the interference condition, the IM clustering condition and partition, a backhaul capability, a UL-DL configuration periodicity, a UL-DL configuration, and combinations thereof;
configuring the nodes in each IM cluster operating in downlink (DL) mode with a transmission technique, wherein the transmission technique is selected from the group consisting of downlink (DL) coordinated multipoint (CoMP) transmission, enhanced inter-cell interference coordination (eICIC), and combinations thereof; and
monitoring the traffic condition, the interference condition, or IM clustering condition and partition of the plurality of nodes to improve a performance metric.

* * * * *